United States Patent
Chen et al.

(10) Patent No.: US 9,510,261 B2
(45) Date of Patent: Nov. 29, 2016

(54) MEASUREMENT CONTROL METHOD, USER EQUIPMENT, CONTROL NODE, AND SYSTEM

(71) Applicant: Huawei Technologies Co., Ltd., Shenzhen (CN)

(72) Inventors: Dong Chen, Shanghai (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/664,090

(22) Filed: Mar. 20, 2015

(65) Prior Publication Data
US 2015/0195763 A1 Jul. 9, 2015

Related U.S. Application Data

(63) Continuation of application No. PCT/CN2013/073130, filed on Mar. 25, 2013.

(30) Foreign Application Priority Data

Sep. 20, 2012 (WO) ................ PCT/CN2012/081684

(51) Int. Cl.
*H04W 36/00* (2009.01)
*H04W 36/30* (2009.01)
(Continued)

(52) U.S. Cl.
CPC ......... *H04W 36/30* (2013.01); *H04W 36/0055* (2013.01); *H04W 36/18* (2013.01); *H04W 36/20* (2013.01)

(58) Field of Classification Search
CPC ... H04W 36/18; H04W 36/20; H04W 36/30; H04W 36/0055
USPC .......................... 455/436, 437, 438, 440, 449
See application file for complete search history.

(56) References Cited

U.S. PATENT DOCUMENTS

| 2009/0054071 A1* | 2/2009 | Mustapha | H04W 36/18 455/450 |
| 2009/0069012 A1* | 3/2009 | Tu | H04W 36/30 455/436 |

(Continued)

FOREIGN PATENT DOCUMENTS

| CN | 1832621 A | 9/2006 |
| CN | 101128002 A | 2/2008 |

(Continued)

OTHER PUBLICATIONS

"3rd Generation Partnership Project; Technical Specification Group Radio Access Network; Radio Resource Control (RRC); Protocol specification (Release 10)," 3GPP TS 25.331, V10.8.0, pp. 1-1892, 3$^{rd}$ Generation Partnership Project, Valbonne, France (Jun. 2012).

*Primary Examiner* — Khai M Nguyen
(74) *Attorney, Agent, or Firm* — Leydig, Voit & Mayer, Ltd.

(57) ABSTRACT

The present application discloses a measurement control method, a user equipment, a control node, and a system, relates to the field of wireless communications, and can reduce handover signaling and improve a handover success rate. The method of the present application mainly includes: receiving measurement configuration information sent by a control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold; detecting cell signal quality or signal strength of a cell; and determining, according to the cell signal quality or signal strength and the measurement configuration information, whether to report an event or a measurement result to the control node. The present application is mainly used in a process of mobility management.

12 Claims, 6 Drawing Sheets

(51) Int. Cl.
*H04W 36/18* (2009.01)
*H04W 36/20* (2009.01)

(56) References Cited

U.S. PATENT DOCUMENTS

| | | | |
|---|---|---|---|
| 2011/0044284 A1 | 2/2011 | Voltolina et al. | |
| 2011/0051692 A1* | 3/2011 | Sambhwani | H04W 36/0072 370/332 |
| 2012/0163338 A1* | 6/2012 | Zhang | H04W 36/0083 370/331 |
| 2012/0327797 A1* | 12/2012 | Siomina | H04W 36/30 370/252 |
| 2013/0182657 A1* | 7/2013 | Sun | H04W 72/0453 370/329 |
| 2014/0036659 A1 | 2/2014 | Gao | |
| 2014/0113647 A1 | 4/2014 | Shen et al. | |
| 2015/0094066 A1* | 4/2015 | Wager | H04W 36/0061 455/436 |

FOREIGN PATENT DOCUMENTS

| | | |
|---|---|---|
| CN | 101453770 A | 6/2009 |
| CN | 102014423 A | 4/2011 |
| CN | 102143522 A | 8/2011 |
| CN | 102158273 A | 8/2011 |
| CN | 102223667 A | 10/2011 |
| CN | 102232314 A | 11/2011 |
| CN | 102457894 A | 5/2012 |
| CN | 102656915 A | 9/2012 |
| CN | 102665188 A | 9/2012 |

\* cited by examiner

MEASUREMENT CONTROL METHOD, USER EQUIPMENT, CONTROL NODE, AND SYSTEM

CROSS-REFERENCE TO RELATED APPLICATIONS

This application is a continuation of International Patent Application No. PCT/CN2013/073130, filed on Mar. 25, 2013, which claims priority to International Application No. PCT/CN2012/081684, filed on Sep. 20, 2012, both of which are hereby incorporated by reference in their entireties.

TECHNICAL FIELD

The present application relates to the field of wireless communications, and in particular, to a measurement control method, a user equipment, a control node, and a system.

BACKGROUND

The field of wireless communications is faced with pressure of explosive growth of data services. To increase a network capacity and reduce transmission costs, the industry has proposed a heterogeneous network (Hetnet) technology. A Hetnet is formed by cells of different sizes and different types, including macro cells and small cells. The small cells include cells in various forms such as a micro cell, a pico cell, a femto cell, and a remote radio head (RRH). In an area with dense traffic, deploying more small cells may effectively increase a network capacity in the area. In addition, because sizes of the small cells are small, and capital expenditures (CAPEX) and operating expenses (OPEX) of the small cells are both low, the Hetnet attracts attention of many operators, and is a major direction of wireless network evolution.

In the prior art, when small cells and macro cells are deployed on a same frequency, to reduce interference to a neighboring cell in an area in which coverage of a macro cell overlaps coverage of a small cell, a user equipment (UE) in a software handover area may add in advance the neighboring cell to an active set; in addition, cells in the active set may also be convenient for access of the UE, and there are relatively few handover signaling overheads.

In a process of implementing the foregoing interference coordination, the applicant finds that the prior art has at least the following problem: When the UE moves from a center of the small cell to an edge, signals of the small cell are attenuated abruptly, while signals of the macro cell become stronger slowly, and consequently, the UE cannot be handed over to the macro cell in time; in addition, in dense deployment of small cells, the UE may be frequently handed over between cells, resulting in a lot of handover signaling overheads.

SUMMARY

Embodiments of the present application provide a measurement control method, a user equipment, a control node, and a system, which can reduce handover signaling and improve a handover success rate.

A first aspect of the present application provides a measurement control method, including: receiving measurement configuration information sent by a control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold; detecting cell signal quality or signal strength of a cell; and determining, according to the cell signal quality or signal strength and the measurement configuration information, whether to report an event or a measurement result to the control node.

According to the first aspect, in a first possible implementation manner, the determining, according to the cell signal quality or signal strength and the measurement configuration information, whether to report an event or a measurement result to the control node includes:

if a first-type cell and a second-type cell that are indicated by the measurement configuration information simultaneously exist in an active set, skipping reporting an event 1b of the first-type cell, or skipping using a measurement result of the second-type cell to affect event evaluation of the first-type cell, where the event 1b of the first-type cell is that signal quality or signal strength of the first-type cell is lower than a predetermined criterion; or if only a first-type cell indicated by the measurement configuration information exists in the active set, when cell signal quality or signal strength of the first-type cell meets an event 1b trigger threshold, reporting an event 1b of the first-type cell, or using a measurement result of a second-type cell to affect event evaluation of the first-type cell, so that the cell is removed from the active set according to an active set update message sent by the control node; or if a cell with the first HCS priority and a cell with the second HCS priority that are indicated by the measurement configuration information simultaneously exist in the active set, skipping reporting an event 1b of the cell with the first HCS priority, or skipping using a measurement result of the cell with the second HCS priority to affect event evaluation of the cell with the first HCS priority; or if only a cell with the first HCS priority indicated by the measurement configuration information exists in the active set, when cell signal quality or signal strength of the cell with the first HCS priority meets an event 1b trigger threshold, reporting an event 1b of the cell with the first HCS priority, or using a measurement result of a cell with the second HCS priority to affect event evaluation of the cell with the first HCS priority, so that the cell is removed from the active set according to an active set update message sent by the control node.

With reference to the first aspect or the first possible implementation manner, in a second possible implementation manner, the determining, according to the cell signal quality or signal strength and the measurement configuration information, whether to report an event or a measurement result to the control node includes:

if a first-type cell and a second-type cell that are indicated by the measurement configuration information simultaneously exist in the active set, and an optimal cell or a serving cell is the second-type cell, skipping reporting an event 1b of the first-type cell, or skipping using a measurement result of the second-type cell to affect event evaluation of the first-type cell; or if an optimal cell or a serving cell is a first-type cell indicated by the measurement configuration information, when cell signal quality or signal strength of a first-type cell other than the optimal cell or serving cell meets an event 1b trigger threshold, reporting an event 1b of the first-type cell other than the optimal cell or serving cell, or using a measurement result of a second-type cell to affect event evaluation of the first-type cell; or if a cell with the first HCS priority and a cell with the second HCS priority that are indicated by the measurement configuration information simultaneously exist in the active set, and an optimal cell or a serving cell is the cell with the second HCS priority, skipping reporting an event 1b of the cell with the first HCS priority, or skipping using a measurement result of the cell with the second HCS priority to affect event evaluation of the cell with the first HCS priority; or if an optimal cell or a serving cell is a cell with the first HCS priority indicated by the measurement configuration information, when cell signal quality or signal strength of another cell with the first HCS priority than the optimal cell or serving cell meets an event 1b trigger threshold, reporting an event 1b of the another cell with the first HCS priority than the optimal cell or serving cell, or using a measurement result of a cell with the second HCS priority to affect event evaluation of the cell with the first HCS priority.

With reference to the first aspect or the first possible implementation manner or the second possible implementation manner, in a third possible implementation manner, the determining, according to the cell signal quality or signal strength and the measurement configuration information, whether to report an event or a measurement result to the control node includes:

triggering reporting of the event to the control node according to the event trigger threshold and the cell signal quality or signal strength of the cell, so that the control node sends an active set update message to a user equipment (UE) according to the received event, where the dedicated parameter for evaluating the event trigger threshold is used to evaluate the event trigger threshold.

With reference to the first aspect or the first possible implementation manner to the third possible implementation manner, in a fourth possible implementation manner, the dedicated parameter for evaluating the event trigger threshold includes: a relative dedicated offset for evaluating the event trigger threshold or an absolute dedicated parameter for evaluating the event trigger threshold; and when a new relative dedicated offset is received, the UE obtains an absolute evaluation parameter by calculation according to an initial evaluation parameter and the new relative dedicated offset, and uses the absolute evaluation parameter obtained by calculation to evaluate the event trigger threshold; or when a new absolute filter coefficient is received, directly uses the new absolute filter coefficient to evaluate the event trigger threshold.

With reference to the first aspect or the first possible implementation manner to the fourth possible implementation manner, in a fifth possible implementation manner, the dedicated parameter for evaluating the event trigger threshold includes one or more of the following parameters: a cell individual offset CIO, a hysteresis, a weight, a reporting range, and duration meeting an event trigger condition.

With reference to the first aspect or the first possible implementation manner to the fifth possible implementation manner, in a sixth possible implementation manner, the determining, according to the cell signal quality or signal strength and the measurement configuration information, whether to report an event or a measurement result to the control node includes:

if the cell is a first-type cell or a cell with the first HCS priority indicated by the measurement configuration information, preferentially measuring the cell or preferentially reporting the measurement result of the cell to the control node.

A second aspect of the present application further provides a measurement control method, including:

receiving a dedicated filter coefficient sent by a control node;

detecting cell signal quality or signal strength of a cell;

calculating a filtered measurement result according to the dedicated filter coefficient of the cell and the cell signal quality or signal strength; and reporting the filtered measurement result to the control node.

With reference to the second aspect, in a first possible implementation manner, the dedicated filter coefficient includes: a relative filter coefficient, or an absolute filter coefficient; and when the relative filter coefficient is received, the absolute filter coefficient is obtained by calculation according to an initial filter coefficient and the relative filter coefficient, and the absolute filter coefficient obtained by calculation is used to calculate the measurement result; or when the absolute filter coefficient is received, the absolute filter coefficient is directly used to calculate the measurement result.

With reference to the second aspect or the first possible implementation manner, in a second possible implementation manner, when an optimal cell or a serving cell is a first-type cell or a cell with the first HCS priority, the dedicated filter coefficient has a positive offset relative to an existing filter coefficient; or when an optimal cell or a serving cell is a second-type cell or a cell with the second HCS priority, the dedicated filter coefficient has a negative offset relative to an existing filter coefficient.

A third aspect of the present application further provides a measurement control method, including:

sending measurement configuration information to a user equipment (UE), where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold;

if the UE determines, according to cell signal quality or signal strength and the measurement configuration information, to report an event or a measurement result, receiving the event or the measurement result reported by the UE; and sending an active set update message to the UE according to the event or measurement result.

According to the third aspect, in a first possible implementation manner, the measurement configuration information includes a list of first-type cells, the type of first-type cells, a list of second-type cells, the type of second-type cells, HCS priorities, a frequency of first-type cells, or a dedicated parameter for evaluating an event trigger threshold.

A fourth aspect of the present application provides a measurement control method, including:

sending a dedicated filter coefficient to a user equipment (UE); and receiving a filtered measurement result reported by the UE, where the filtered measurement result is obtained by calculation according to the dedicated filter coefficient and cell signal quality or signal strength.

According to the fourth aspect, in a first possible implementation manner, the dedicated filter coefficient includes: a relative filter coefficient or an absolute filter coefficient.

With reference to the fourth aspect or the first possible implementation manner, in a second possible implementation manner, the sending a dedicated filter coefficient to a user equipment (UE) includes:

when an optimal cell or a serving cell of the UE is a first-type cell or a cell with the first HCS priority, sending, to the UE, a dedicated filter coefficient that has a positive offset relative to an existing filter coefficient; or when an optimal cell or a serving cell of the UE is a second-type cell or a cell with the second HCS priority, sending, to the UE, a dedicated filter coefficient that has a negative offset relative to an existing filter coefficient.

A fifth aspect of the present application provides a measurement control method, including:

receiving an event 1b of a cell reported by a user equipment (UE), where the event 1b of the cell is that signal quality or signal strength of the cell is lower than a predetermined criterion; and determining, according to measurement configuration information and the event 1b, whether to send an active set update message to the UE, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

With reference to the fifth aspect, in a first possible implementation manner, the determining, according to measurement configuration information and the event 1b, whether to send an active set update message to the UE includes:

if a first-type cell and a second-type cell that are indicated by the measurement configuration information simultaneously exist in an active set of the UE, skipping sending an active set update message for removing the first-type cell; or if only a first-type cell indicated by the measurement configuration information exists in an active set of the UE, after an event 1b of the first-type cell reported by the UE is received, sending, to the UE, an active set update message for removing the first-type cell; or if a cell with the first HCS priority and a cell with the second HCS priority that are indicated by the measurement configuration information simultaneously exist in an active set of the UE, skipping sending an active set update message for removing the cell with the first HCS priority; or if only a cell with the first HCS priority indicated by the measurement configuration information exists in an active set of the UE, after an event 1b that is of the cell with the first HCS priority and reported by the UE is received, sending, to the UE, an active set update message for removing the cell with the first HCS priority.

With reference to the fifth aspect or the first possible implementation manner, in a second possible implementation manner, the determining, according to measurement configuration information and the event 1b, whether to send an active set update message to the UE includes:

if a first-type cell and a second-type cell that are indicated by the measurement configuration information simultaneously exist in an active set of the UE, and an optimal cell or a serving cell is the second-type cell, skipping sending, to the UE, an active set update message for removing the first-type cell; or if an optimal cell or a serving cell of the UE is a first-type cell indicated by the measurement configuration information, when an event 1b that is of a first-type cell other than the optimal cell or a serving cell and reported by the UE is received, sending an active set update message for removing the first-type cell; or if a cell with the first HCS priority and a cell with the second HCS priority that are indicated by the measurement configuration information simultaneously exist in an active set of the UE, and an optimal cell or a serving cell is the cell with the second HCS priority, skipping sending, to the UE, an active set update message for removing the cell with the first HCS priority; or if an optimal cell or a serving cell of the UE is a cell with the first HCS priority indicated by the measurement configuration information, when an event 1b that is of a cell with the first HCS priority other than the optimal cell or serving cell and reported by the UE is received, sending an active set update message for removing the cell with the first HCS priority than the optimal cell or serving cell.

A sixth aspect of the present application provides a user equipment (UE), including:

a receiving unit, configured to receive measurement configuration information sent by a control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold;

a detecting unit, configured to detect cell signal quality or signal strength of a cell; and a determining unit, configured to determine, according to the cell signal quality or signal strength detected by the detecting unit and the measurement configuration information received by the receiving unit, whether to report an event or a measurement result to the control node.

With reference to the sixth aspect, in a first possible implementation manner, the determining unit includes:

a first determining module, configured to: when a first-type cell and a second-type cell that are indicated by the measurement configuration information received by the receiving unit simultaneously exist in an active set, skip reporting an event 1b of the first-type cell, or skipping using a measurement result of the second-type cell to affect event evaluation of the first-type cell; and a second determining module, configured to: when only a first-type cell indicated by the measurement configuration information received by the receiving unit exists in the active set, and cell signal quality or signal strength of the first-type cell meets an event 1b trigger threshold, report an event 1b of the first-type cell, or use a measurement result of a second-type cell to affect event evaluation of the first-type cell, so that the cell is removed from the active set according to an active set update message sent by the control node.

With reference to the sixth aspect or the first possible implementation manner, in a second possible implementation manner, the determining unit includes:

a third determining module, configured to: when a first-type cell and a second-type cell that are indicated by the measurement configuration information received by the receiving unit simultaneously exist in an active set, and an optimal cell or a serving cell is the second-type cell, skip reporting an event 1b of the first-type cell, or skipping using a measurement result of the second-type cell to affect event evaluation of the first-type cell; or when a cell with the first HCS priority and a cell with the second HCS priority that are indicated by the measurement configuration information simultaneously exist in an active set, and an optimal cell or a serving cell is the cell with the second HCS priority, skip reporting an event 1b of the cell with the first HCS priority, or a measurement result of the cell of the second HCS priority does not affect event evaluation of the cell with the first HCS priority; and a fourth determining module, configured to: when an optimal cell or a serving cell is a first-type cell or a cell with the first HCS priority indicated by the measurement configuration information received by the receiving unit, and cell signal quality or signal strength of a first-type cell or a cell with the first HCS priority other than the optimal cell or serving cell meets an event 1b trigger threshold, report an event 1b of the first-type cell or the cell of the first HCS priority other than the optimal cell or serving cell, or use a measurement result of a second-type cell to affect event evaluation of the first-type cell.

With reference to the sixth aspect or the first possible implementation manner or the second possible implementation manner, in a third possible implementation manner, the determining unit includes:

a fifth determining module, configured to trigger reporting of the event to the control node according to the event trigger threshold and the cell signal quality or signal strength of the cell, so that the control node sends an active set update message to the UE according to the received event; where the measurement configuration information received by the receiving unit includes the dedicated parameter for evaluating the event trigger threshold.

With reference to the sixth aspect or the first possible implementation manner to the third possible implementation manner, in a fourth possible implementation manner, the determining unit includes:

a sixth determining module, configured to preferentially report the measurement result of the cell to the control node when the cell is a first-type cell indicated by the measurement configuration information received by the receiving unit.

A seventh aspect of the present application further provides a user equipment (UE), including:

a receiving unit, configured to receive a dedicated filter coefficient sent by a control node;

a detecting unit, configured to detect cell signal quality or signal strength of a cell;

a calculating unit, configured to calculate a filtered measurement result according to the dedicated filter coefficient of the cell received by the receiving unit and the cell signal quality or signal strength detected by the detecting unit; and a sending unit, configured to report the filtered measurement result obtained by the calculating unit by calculation to the control node.

An eighth aspect of the present application further provides a control node, including:

a first sending unit, configured to send measurement configuration information to a user equipment (UE), where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold;

a receiving unit, configured to: when the UE determines, according to cell signal quality or signal strength and the measurement configuration information, to report an event or a measurement result, receive the event or the measurement result reported by the UE; and a second sending unit, configured to send an active set update message to the UE according to the event or the measurement result received by the receiving unit.

A ninth aspect of the present application further provides a control node, including:

a sending unit, configured to send a dedicated filter coefficient to a user equipment (UE); and a receiving unit, configured to receive a filtered measurement result reported by the UE, where the filtered measurement result is obtained by calculation according to the dedicated filter coefficient and cell signal quality or signal strength.

With reference to the ninth aspect, in a first possible implementation manner, the sending unit includes:

a first sending unit, configured to: when an optimal cell or a serving cell of the UE is a first-type cell or a cell with the first HCS priority, send, to the UE, a dedicated filter coefficient that has a positive offset relative to an existing filter coefficient; and a second sending unit, configured to: when an optimal cell or a serving cell of the UE is a second-type cell or a cell with the second HCS priority, send, to the UE, a dedicated filter coefficient that has a negative offset relative to an existing filter coefficient.

A tenth aspect of the present application provides a control node, including:

a receiving unit, configured to receive an event 1b of a cell reported by a user equipment (UE); and a determining unit, configured to determine, according to measurement configuration information and the event 1b received by the receiving unit, whether to send an active set update message to the UE, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

With reference to the tenth aspect, in a first possible implementation manner, the determining unit includes:

a seventh determining unit, configured to: when a first-type cell and a second-type cell that are indicated by the measurement configuration information simultaneously exist in an active set of the UE, skip sending an active set update message for removing the first-type cell; or when a cell with the first HCS priority and a cell with the second HCS priority that are indicated by the measurement configuration information simultaneously exist in an active set of the UE, skip sending an active set update message for removing the cell with the first HCS priority; and an eighth determining unit, configured to: when only a first-type cell or a cell with the first HCS priority indicated by the measurement configuration information exists in the active set of the UE, after an event 1b of the first-type cell reported by the UE is received, send, to the UE, an active set update message for removing the first-type cell or the cell with the first HCS priority.

With reference to the tenth aspect or the first possible implementation manner, in a second possible implementation manner, the determining unit includes a ninth determining unit, configured to: when a first-type cell and a second-type cell that are indicated by the measurement configuration information simultaneously exist in an active set of the UE, and an optimal cell or a serving cell is the second-type cell, skip sending, to the UE, an active set update message for removing the first-type cell; or when a cell with the first HCS priority and a cell with the second HCS priority that are indicated by the measurement configuration information simultaneously exist in an active set, and an optimal cell or a serving cell is the cell with the second HCS priority, skip reporting an event 1b of the cell with the first HCS priority; and a tenth determining unit, configured to: when an optimal cell or a serving cell of the UE is a first-type cell or a cell with the first HCS priority indicated by the measurement configuration information, and an event 1b that is of a first-type cell or a cell with the first HCS priority other than the optimal cell or serving cell and reported by the UE is received, send an active set update message for removing the first-type cell or the cell with the first HCS priority than the optimal cell or serving cell.

An eleventh aspect of the present application provides a measurement control system, including a user equipment (UE) and a control node, where the UE is configured to: receive measurement configuration information sent by the control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold; detect cell signal quality or signal strength of a cell; and determine, according to the cell signal quality or signal strength and the measurement configuration information, whether to report an event or a measurement result of the cell to the control node; and the control node is configured to: send the measurement configuration information to the UE, where the measurement configuration information includes the list of the first-type cells, the type of the first-type cells, the list of the second-type cells, the type of the second-type cells, the hierarchical cell structure (HCS) priorities, the frequency of the first-type cells, or the dedicated parameter for evaluating the event trigger threshold; if the UE determines, according to the cell signal quality or signal strength and the measurement configuration information, to report the event or measurement result, receive the event or the measurement result reported by the UE; and send an active set update message to the UE according to the event or measurement result;

alternatively, the UE is configured to: receive a dedicated filter coefficient sent by the control node; detect cell signal quality or signal strength of a cell; calculate a filtered measurement result according to the dedicated filter coefficient of the cell and the cell signal quality or signal strength; and report the filtered measurement result to the control node; and the control node is configured to: send the dedicated filter coefficient to the UE; and receive the filtered measurement result reported by the UE, where the filtered measurement result is obtained by calculation according to the dedicated filter coefficient and the cell signal quality or signal strength;

alternatively, the UE is configured to: report the event 1b of the cell to the control node according to detected cell signal quality or signal strength, and for the first-type cells indicated by the measurement configuration information, skip expecting the control node to send an active set update message; and the control node is configured to: receive an event 1b of a cell reported by the UE, and determine, according to measurement configuration information and the event 1b, whether to send an active set update message to the UE, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

A twelfth aspect of the present application further provides a user equipment (UE), including:

a receiver, configured to receive measurement configuration information sent by a control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold;

a processor, configured to detect cell signal quality or signal strength of a cell; and a transmitter, configured to determine, according to the cell signal quality or signal strength detected by the processor and the measurement configuration information received by the receiver, whether to report an event or a measurement result to the control node.

With reference to the twelfth aspect, in a first possible implementation manner, the transmitter is further configured to:

when a first-type cell and a second-type cell that are indicated by the measurement configuration information received by the receiver simultaneously exist in an active set, skip reporting an event 1b of the first-type cell, or a measurement result of the second-type cell does not affect event evaluation of the first-type cell; or when only a first-type cell indicated by the measurement configuration information received by the receiver exists in the active set, and cell signal quality or signal strength of the first-type cell meets an event 1b trigger threshold, report an event 1b of the first-type cell, or use a measurement result of a second-type cell to affect event evaluation of the first-type cell, so that the cell is removed from the active set according to an active set update message sent by the control node; or when a cell with the first HCS priority and a cell with the second HCS priority that are indicated by the measurement configuration information received by the receiver simultaneously exist in the active set, skip reporting an event 1b of the cell with the first HCS priority, or skipping using a measurement result of the cell with the second HCS priority to affect event evaluation of the cell with the first HCS priority; or when only a cell with the first HCS priority indicated by the measurement configuration information received by the receiver exists in the active set, and cell signal quality or signal strength of the cell with the first HCS priority meets an event 1b trigger threshold, report an event 1b of the cell with the first HCS priority, or use a measurement result of a cell with the second HCS priority to affect event evaluation of the cell with the first HCS priority, so that the cell is removed from the active set according to an active set update message sent by the control node.

With reference to the twelfth aspect or the first possible implementation manner, in a second possible implementation manner, the transmitter is further configured to:

when a first-type cell and a second-type cell that are indicated by the measurement configuration information received by the receiver simultaneously exist in the active set, and an optimal cell or a serving cell is the second-type cell, skip reporting an event 1b of the first-type cell, or a measurement result of the second-type cell does not affect event evaluation of the first-type cell; or when an optimal cell or a serving cell is a first-type cell indicated by the measurement configuration information received by the receiver, and cell signal quality or signal strength of a first-type cell other than the optimal cell or serving cell meets an event 1b trigger threshold, report an event 1b of the first-type cell other than the optimal cell or the serving cell, or use a measurement result of a second-type cell to affect event evaluation of the first-type cell; or when a cell with the first HCS priority and a cell with the second HCS priority that are indicated by the measurement configuration information received by the receiver simultaneously exist in the active set, and an optimal cell or a serving cell is the cell with the second HCS priority, skip reporting an event 1b of the cell with the first HCS priority, or skipping using a measurement result of the cell with the second HCS priority to affect event evaluation of the cell with the first HCS priority; or when an optimal cell or a serving cell is a cell with the first HCS priority indicated by the measurement configuration information received by the receiver, and cell signal quality or signal strength of another cell with the first HCS priority than the optimal cell or serving cell meets an event 1b trigger threshold, report an event 1b of the cell with the first HCS priority other than the optimal cell or serving cell, or use a measurement result of a cell with the second HCS priority to affect event evaluation of the cell with the first HCS priority.

With reference to the twelfth aspect or the first possible implementation manner or the second possible implementation manner, in a third possible implementation manner, the transmitter is further configured to:

trigger reporting of the event to the control node according to the event trigger threshold and the cell signal quality or signal strength of the cell, so that the control node sends an active set update message to the UE according to the received event; where the measurement configuration information received by the receiver includes the dedicated parameter for evaluating the event trigger threshold.

With reference to the twelfth aspect or the first possible implementation manner to the third possible implementation manner, in a fourth possible implementation manner, the transmitter is further configured to:

preferentially report the measurement result of the cell to the control node when the cell is a first-type cell indicated by the measurement configuration information received by the receiver.

A thirteenth aspect of the present application further provides a user equipment (UE), including:

a receiver, configured to receive a dedicated filter coefficient sent by a control node;

a processor, configured to detect cell signal quality or signal strength of a cell, and calculate a filtered measurement result according to the dedicated filter coefficient of the cell received by the receiver and the detected cell signal quality or signal strength; and a transmitter, configured to report the filtered measurement result obtained by the processor by calculation to the control node.

A fourteenth aspect of the present application provides a control node, including:

a transmitter, configured to send measurement configuration information to a user equipment (UE), where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold; and a receiver, configured to: when the UE determines, according to cell signal quality or signal strength and the measurement configuration information, to report an event or a measurement result, receive the event or the measurement result reported by the UE; where the transmitter is further configured to send an active set update message to the UE according to the event or the measurement result received by the receiver.

A fifteenth aspect of the present application provides a control node, including:

a transmitter, configured to send a dedicated filter coefficient to a user equipment (UE); and a receiver, configured to receive a filtered measurement result reported by the UE, where the filtered measurement result is obtained by calculation according to the dedicated filter coefficient and cell signal quality or signal strength.

With reference to the fifteenth aspect of the present application, in a possible implementation manner, the transmitter is further configured to:

when an optimal cell or a serving cell of the UE is a first-type cell or a cell with the first HCS priority, send, to the UE, a dedicated filter coefficient that has a positive offset relative to an existing filter coefficient; or when an optimal cell or a serving cell of the UE is a second-type cell or a cell with the second HCS priority, send, to the UE, a dedicated filter coefficient that has a negative offset relative to an existing filter coefficient.

A sixteenth aspect of the present application further provides a control node, including:

a receiver, configured to receive an event 1b of a cell reported by a user equipment (UE); and a transmitter, configured to determine, according to measurement configuration information and the event 1b received by the receiver, whether to send an active set update message to the UE, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

With reference to the sixteenth aspect, in a first possible implementation manner, the transmitter is further configured to:

when a first-type cell and a second-type cell that are indicated by the measurement configuration information simultaneously exist in an active set of the UE, skip sending an active set update message for removing the first-type cell; or when only a first-type cell indicated by the measurement configuration information exists in an active set of the UE, after an event 1b of the first-type cell reported by the UE is received, send, to the UE, an active set update message for removing the first-type cell; or when a cell with the first HCS priority and a cell with the second HCS priority that are indicated by the measurement configuration information simultaneously exist in an active set of the UE, skip sending an active set update message for removing the cell with the first HCS priority; or when only a cell with the first HCS priority indicated by the measurement configuration information exists in an active set of the UE, after an event 1b that is of the cell with the first HCS priority and reported by the UE is received, send, to the UE, an active set update message for removing the cell with the first HCS priority.

With reference to the sixteenth aspect or the first possible implementation manner, in a second possible implementation manner, the transmitter is further configured to:

when a first-type cell and a second-type cell that are indicated by the measurement configuration information simultaneously exist in an active set of the UE, and an optimal cell or a serving cell is the second-type cell, skip sending, to the UE, an active set update message for removing the first-type cell; or when an optimal cell or a serving cell of the UE is a first-type cell indicated by the measurement configuration information, and an event 1b that is of a first-type cell other than the optimal cell or serving cell and reported by the UE is received, send an active set update message for removing the first-type cell; or when a cell with the first HCS priority and a cell with the second HCS priority that are indicated by the measurement configuration information simultaneously exist in an active set of the UE, and an optimal cell or a serving cell is the cell with the second HCS priority, skip sending, to the UE, an active set update message for removing the cell with the first HCS priority; or when an optimal cell or a serving cell of the UE is a cell with the first HCS priority indicated by the measurement configuration information, and an event 1b that is of a cell with the first HCS priority other than the optimal cell or serving cell and reported by the UE is received, send an active set update message for removing the cell with the first HCS priority than the optimal cell or serving cell.

A seventeenth aspect of the present application further provides a link management method, including:

sending a link management indication to a base station, so that the base station no longer sends a radio link failure indication to a control node or sends a radio link failure indication to a control node for only a limited number of times.

An eighteenth aspect of the present application further provides a link management method, including:

receiving a link management indication sent by a control node, where the link management indication is used to instruct the base station to no longer send a radio link failure indication to the control node or to send a radio link failure indication to the control node for only a limited number of times.

A nineteenth aspect of the present application further provides a link management method, including:

receiving a synchronization detection parameter sent by a control node, where the synchronization detection parameter includes at least one piece of the following information: the number of synchronization primitives, the number of out-of-synchronization primitives, and a failure detection timer; and performing uplink synchronization detection according to the synchronization detection parameter.

A twentieth aspect of the present application further provides a link management method, including:

sending a synchronization detection parameter to a base station, where the synchronization detection parameter includes at least one piece of the following information: the number of synchronization primitives, the number of out-of-synchronization primitives, and a failure detection timer, so that the base station performs uplink synchronization detection according to the synchronization detection parameter.

A twenty-first aspect of the present application further provides a measurement control method, including:

receiving measurement configuration information sent by a control node, where the measurement configuration information includes that a signal measurement value of a second-type cell does not affect event evaluation of a first-type cell, and/or that a signal measurement value of a second-type cell affects event evaluation of a third-type cell; and determining, according to a signal measurement value of the first-type cell and the measurement configuration information, whether to report an event or a measurement result to the control node.

With reference to the twenty-first aspect of the present application, in a first possible implementation manner, a form of the second-type cell, first-type cell, and third-type cell indicated by the measurement configuration information may be a form of a single cell, or may be a form of a cell list, so that whether measurement reporting of multiple cells affects each other may be configured simultaneously; where the event may be an event 1a or an event 1b;

in evaluation of the event 1a, when only the second-type cell exists in an active set, during event evaluation of the first-type cell, a UE may also not use the signal measurement value of the second-type cell to affect event evaluation of the first-type cell, but use the signal measurement value of the second-type cell to affect event evaluation of the third-type cell;

specifically, for example, the first-type cell is a macro cell, the second-type cell is a small cell and is a cell in the active set, and the third-type cell is a small cell; the first-type cell and the third-type cell may be cells in the active set, a monitored cell, or a detected cell; in this case, when the UE evaluates an event 1a of the first-type cell, the signal measurement value of the second-type cell is not considered, and when the terminal evaluates an event 1a of the third-type cell, the signal measurement value of the second-type cell is considered.

With reference to the twenty-first aspect of the present application or the first possible implementation manner of the twenty-first aspect, in a second possible implementation manner, the determining, according to a signal measurement value of the first-type cell and the measurement configuration information, whether to report an event or a measurement result to the control node includes:

triggering reporting of the event to the control node according to an event trigger threshold and cell signal quality or signal strength of the first-type cell, where a dedicated parameter for evaluating the event trigger threshold is used to evaluate the event trigger threshold.

A twenty-second aspect of the present application further provides a user equipment (UE), including:

a receiver, configured to receive measurement configuration information sent by a control node, where the measurement configuration information includes that a signal measurement value of a second-type cell does not affect event evaluation of a first-type cell, and/or that a signal measurement value of a second-type cell affects event evaluation of a third-type cell; and a processor, configured to determine, according to a signal measurement value of the first-type cell and the measurement configuration information received by the receiver, whether to report an event or a measurement result to the control node.

With reference to the twenty-second aspect of the present application, in a first possible implementation manner, the processor is further configured to:

trigger reporting of the event to the control node according to an event trigger threshold and cell signal quality or signal strength of the first-type cell, where a dedicated parameter for evaluating the event trigger threshold is used to evaluate the event trigger threshold.

A twenty-third aspect of the present application provides a measurement control method, including:

configuring, by a control node, measurement configuration information, where the measurement configuration information includes that a signal measurement value of a second-type cell does not affect event evaluation of a first-type cell, and/or that a signal measurement value of a second-type cell affects event evaluation of a third-type cell; and sending the measurement configuration information to a user equipment (UE), so that the UE determines, according to a signal measurement value of the first-type cell and the measurement configuration information, whether to report an event or a measurement result to the control node.

A twenty-fourth aspect of the present application further provides a control node, including:

a memory, configured to store measurement configuration information, where the measurement configuration information includes that a signal measurement value of a second-type cell does not affect event evaluation of a first-type cell, and/or that a signal measurement value of a second-type cell affects event evaluation of a third-type cell; and a transmitter, configured to send the measurement configuration information stored in the memory to a user equipment (UE), so that the UE determines, according to a signal measurement value of the first-type cell and the measurement configuration information, whether to report an event or a measurement result to the control node.

According to the measurement control method, the user equipment, the control node, and the system provided by the embodiments of the present application, whether to report an event or a measurement result is determined according to measurement configuration information and detected cell signal quality or signal strength. In comparison with the prior art in which events or measurement results are uniformly reported according to cell signal quality or signal strength, non-reporting or deferred reporting or advance reporting of an event or a measurement result of a first-type cell may be controlled according to a requirement, so that the first-type cell is retained in an active set of the UE as far as possible. Thereby, a handover signaling overhead for handing over to the first-type cell may be reduced, handing over to the first-type cell in time is implemented, and a handover failure is avoided.

BRIEF DESCRIPTION OF DRAWINGS

To describe the technical solutions in the embodiments of the present application or in the prior art more clearly, the following briefly introduces the accompanying drawings required for describing the embodiments. Apparently, the accompanying drawings in the following description merely show some embodiments of the present application, and a person of ordinary skill in the art may still derive other drawings from these accompanying drawings without creative efforts.

DESCRIPTION OF EMBODIMENTS

Figure 1:
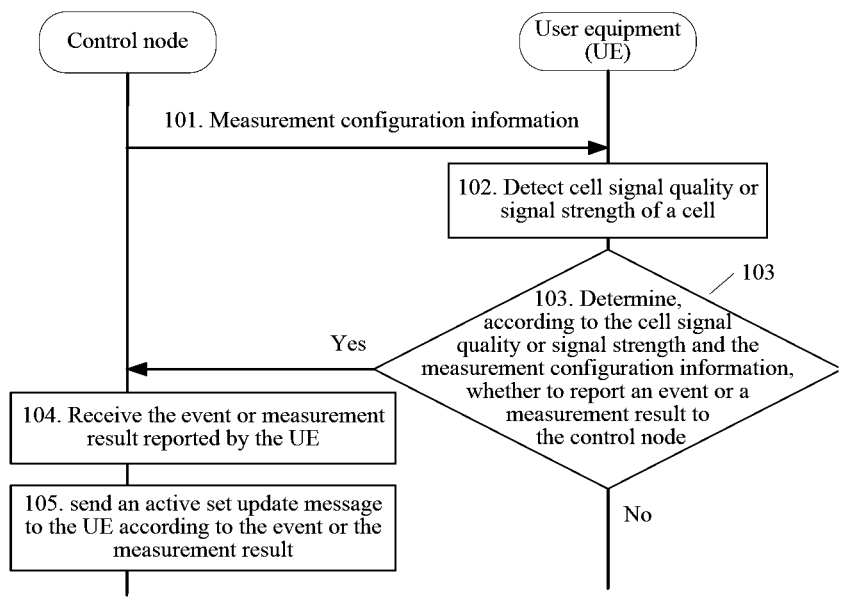
FIG. 1 is a flowchart of a measurement control method according to an embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Technologies described in this specification may be applied to various communications systems, for example, current 2G and 3G communications systems and a next-generation communications system, for example, a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, and other communications systems.

Various aspects are described in this specification with reference to a user equipment and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or a user equipment.

The base station (for example, an access point) may refer to a device in communication with a wireless terminal via one or more sectors at an air interface in an access network.

The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS) in GSM or the CDMA, may also be a base station (NodeB) in WCDMA, and may further be an evolved NodeB (NodeB, eNB, or e-NodeB, evolved Node B) in the LTE, which is not limited in the present application.

The base station controller may be a base station controller (BSC) in GSM or CDMA, or a radio network controller (RNC) in WCDMA, which is not limited in the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

An embodiment of the present application provides a measurement control method. As shown in FIG. 1, the method may include:

101. A user equipment (UE) receives measurement configuration information sent by a control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

For example, the measurement configuration information may be a list of macro cells, where a macro cell is considered as a first-type cell, and a small cell is considered as a second-type cell, while the UE may learn cell types of neighboring cells.

For example, an event may be an event 1a or 1b. The event 1a means that signal quality or signal strength of a cell reaches or is higher than a threshold. The event 1b means that signal quality or signal strength of a cell is lower than a threshold.

For example, the control node may be a base station controller or a flat base station. In different application scenarios, the measurement configuration information may include a list of first-type cells, the type of first-type cells, a list of second-type cells, the type of second-type cells, hierarchical cell structure (HCS) priorities, a frequency of first-type cells, or a dedicated parameter for evaluating the event, or the like.

102. The UE detects cell signal quality or signal strength of a cell.

The UE detects cell signal quality or signal strength of a neighboring cell, and reports an event or a measurement result to the control node according to the signal quality or signal strength, for example, when the signal quality or signal strength is higher than a threshold, reports an event 1a to the control node. A difference in the embodiment of the present application is that the UE may further determine, according to the measurement configuration information, whether to execute reporting; in another embodiment of the present invention, after reporting, the UE does not expect an active set update message.

For example, the UE detects signal quality of neighboring cells, where a serving cell of the UE is a first-type cell (e.g. which is a macro cell) indicated by the measurement configuration information, and even if signal quality of the serving cell is lower than an event 1b trigger threshold, the UE does not report an event 1b to the control node; certainly, for a second-type cell (e.g. which is small cell) indicated by the measurement configuration information, the UE normally reports an event 1b. In another embodiment of the present invention, a serving cell of the UE is a first-type cell (e.g. which is macro cell) indicated by the measurement configuration information, when signal quality of a serving cell is lower than an event 1b trigger threshold, the UE reports an event 1b, but even if no active set update message sent by a control node is received in a time period, reporting of an event 1b of the serving cell is not changed to periodic event reporting.

103. The UE determines, according to the cell signal quality or signal strength and the measurement configuration information, whether to report an event or a measurement result of a first-type cell or a cell with the first HCS priority to the control node.

Cells with the first HCS priority may be cells whose HCS priorities are lower than a level. Similarly, cells of the second HCS priority may be cells whose HCS priorities are higher than a level. Alternatively, cells with the first HCS priority may be a proportion of cells selected in ascending order of priorities from neighboring cells detected by the UE; and cells of the second HCS priority may be other neighboring cells than the cells with the first HCS priority, or a proportion of cells selected in descending order of priorities.

For example, according to a first-type cell or a cell with the first HCS priority indicated by the measurement configuration information, when cell signal quality or signal strength meets an event trigger threshold, the UE may select to report an event or not to report an event. In another embodiment of the present invention, when cell signal quality or signal strength meets an event trigger threshold, the UE may also report an event, but for a first-type cell or a cell with the first HCS priority indicated by the measurement configuration information, does not expect an active set update message for removing the first-type cell or the cell with the first HCS priority, that is, does not change event reporting to periodic event reporting. In another embodiment of the present invention, according to a dedicated parameter for evaluating a threshold in the measurement configuration information, the UE may also use the threshold obtained by evaluation to trigger reporting of an event, for example, when cell signal quality is lower than an event 1b trigger threshold obtained by evaluation by using the dedicated parameter, trigger reporting of an event 1b. The measurement control method provided by the present application includes but is not limited to the methods enumerated in this embodiment.

In this embodiment, because the measurement configuration information is configured, reporting of an event or a measurement result may be controlled. By taking measures such as skipping reporting an event 1b of a first-type cell and increasing an event 1a trigger threshold of a second-type cell, the first-type cell or a cell with the first HCS priority is added to an active set in advance, and removing the first-type cell or the cell with the first HCS priority from the active set is deferred. Thereby, the first-type cell or the cell with the first HCS priority is retained in the active set as far as possible, handover signaling required for handing over the UE to the first-type cell or the cell with the first HCS priority is reduced, and a problem of a failure in handing over to the first-type cell or the cell with the first HCS priority is avoided.

It is understandable that, if the UE determines to report an event or a measurement result to the control node, the method of this embodiment further includes subsequent steps 104 and 105; otherwise, if the UE determines not to report an event or a measurement result to the control node, the subsequent steps 104 and 105 may not need to be executed.

104. The control node receives the event or the measurement result reported by the UE.

By using a determining result in step 103, the UE determines whether to report the event or measurement result.

105. The control node sends an active set update message to the UE according to the event or measurement result.

For example, after receiving an event 1a, the control node may send an active set update message to the UE to add a corresponding cell to the active set of the UE. In another embodiment of the present invention, after receiving an event 1b, the control node may send an active set update message to the UE to remove a corresponding cell from the active set of the UE. In another embodiment of the present invention, according to a measurement result reported by the UE, the control node may remove a cell whose signal quality or signal strength is lower than a predetermined threshold from the active set of the UE, and add a cell whose signal quality or signal strength is higher than a predetermined threshold to the active set of the UE.

By using the measurement control method provided by the embodiment of the present application, whether to report an event or a measurement result is determined according to measurement configuration information and detected cell signal quality or signal strength. In comparison with the prior art in which events or measurement results are uniformly reported according to cell signal quality or signal strength, non-reporting or deferred reporting or advance reporting of an event or a measurement result of a first-type cell may be controlled according to a requirement, so that an objective of deferring removing the first-type cell from an active set of a user equipment (UE) or adding in advance a corresponding cell to an active set of the UE is achieved. Thereby, a handover signaling overhead for handing over to the first-type cell may be reduced, handing over to the first-type cell in time is implemented, and a handover failure is avoided.

Further, optionally, in an implementation manner of the embodiment of the present application, a specific implementation method of step 103 may be as follows:

103a. If a first-type cell and a second-type cell that are indicated by the measurement configuration information simultaneously exist in the active set, skip reporting an event 1b of the first-type cell, or skip reporting an event 1a of the second-type cell.

In this implementation manner, the measurement configuration information may include a list of first-type cells, the type of first-type cells, a list of second-type cells, the type of second-type cells, or HCS priorities, or the like. For example, the measurement configuration information may be a list of macro cells, where a macro cell is considered as a first-type cell, and a small cell is considered as a second-type cell, while the UE may learn cell types of neighboring cells. In this manner, when the UE gradually approaches a small cell within coverage of a macro cell, signal quality or signal strength of the small cell increases drastically, while a change of signal quality or signal strength of the macro cell tends to be smooth, and consequently, the macro cell meets an event 1b trigger threshold. Therefore, to retain the macro cell in the active set as far as possible, an event 1b of the macro cell may not be reported.

In addition, when a second-type cell meets an event 1a trigger threshold, an event 1a of the second-type cell is not reported, so that adding the second-type cell to the active set of the UE may be deferred.

Similarly, if a cell with the first HCS priority and a cell with the second HCS priority that are indicated by the measurement configuration information simultaneously exist in the active set, an event 1b of the cell with the first HCS priority is not reported. The first-type cells and second-type cells may also be distinguished by using the list of the second-type cells. If the HCS priorities are used as measurement configuration information, cells whose priorities are lower than a predetermined level may be preset as first-type cells, and cells whose priorities are higher than a predetermined level may be preset as second-type cells. A person skilled in the art may indicate the first-type cells and second-type cells without creative efforts, which is not further described in detail in the embodiments of the present application.

103b. If only a first-type cell indicated by the measurement configuration information exists in the active set, when cell signal quality or signal strength of the first-type cell meets an event 1b trigger threshold, report an event 1b of the first-type cell, so that the cell is removed from the active set according to an active set update message sent by the control node.

Similarly, if only a cell with the first HCS priority indicated by the measurement configuration information exists in the active set, when cell signal quality or signal strength of the cell with the first HCS priority meets an event 1b trigger threshold, an event 1b of the cell with the first HCS priority is reported, so that the cell is removed from the active set according to an active set update message sent by the control node.

If only first-type cells or cells with the first HCS priority exist in the active set of the UE, that is, the UE is not within coverage of any second-type cell or cell with the second HCS priority, to save radio link resources, a cell with higher signal quality or signal strength may be selected from the multiple first-type cells or cells with the first HCS priority. For example, only two first-type cells or cells with the first HCS priority exist in the active set of the UE. When either one of the two first-type cells or cells with the first HCS priority meets an event 1b trigger threshold, an event 1b of the cell may be reported, so that the control node sends an active set update message for removing the cell to remove, from the active set, the first-type cell or the cell with the first HCS priority whose signal quality or signal strength is lower than a predetermined threshold. It should be noted that, for cases that are not described in this implementation manner, a conventional event reporting procedure in the protocol may also be executed.

Optionally, in another implementation manner of the embodiment of the present application, a specific implementation method of step 103 may also be as follows:

103c. If a first-type cell and a second-type cell that are indicated by the measurement configuration information simultaneously exist in the active set, and an optimal cell or a serving cell is the second-type cell, skip reporting an event 1b of the first-type cell.

In this implementation manner, the measurement configuration information may include a list of first-type cells, the type of first-type cells, a list of second-type cells, the type of second-type cells, or HCS priorities, or the like. For example, the measurement configuration information may be a list of first-type cells, where the list is made up of multiple cell identities, and cells beyond the list are considered as second-type cells. When the UE is within coverage of a first-type cell and located in a center of a second-type cell (or the second-type cell is an optimal cell or a serving cell), signal quality or signal strength of the first-type cell easily meets an event 1b trigger threshold. However, to avoid a problem that a timely handover cannot be performed in a case in which the UE leaves the second-type cell for a short time and enters the coverage of only the first-type cell, and the like, an event 1b of the first-type cell may not be reported, so that the first-type cell is retained in the active set to facilitate access.

In another implementation manner, if a cell with the first HCS priority and a cell with the second HCS priority that are indicated by the measurement configuration information simultaneously exist in the active set, and an optimal cell or a serving cell is the cell with the second HCS priority, an event 1b of the cell with the first HCS priority is not reported.

103d. If an optimal cell or a serving cell is a first-type cell indicated by the measurement configuration information, when cell signal quality or signal strength of a first-type cell other than the optimal cell or serving cell meets an event 1b trigger threshold, report an event 1b of the first-type cell other than the optimal cell or serving cell.

If two or more first-type cells simultaneously exist in the active set of the UE, regardless of whether a second-type cell exists in the active set, a cell with highest signal quality or signal strength may be selected from the multiple first-type cells as an optimal cell or a serving cell, while an event 1b of the other first-type cells is reported, and the other first-type cells than the optimal cell or serving cell are removed from the active set to save radio link resources.

In another implementation manner, if an optimal cell or a serving cell is a cell with the first HCS priority indicated by the measurement configuration information, when cell signal quality or signal strength of another cell with the first HCS priority than the optimal cell or serving cell meets an event 1b trigger threshold, an event 1b of the another cell with the first HCS priority than the optimal cell or serving cell is reported.

By using the measurement control method provided in the foregoing implementation manners of the embodiment of the present application, a user equipment (UE) may determine, according to a first-type cell and a second-type cell that are indicated by measurement configuration information, whether to report an event or a measurement result; and in another embodiment of the present invention, determine, according to a cell with the first HCS priority and a cell with the second HCS priority indicated by measurement configuration information, whether to report an event or a measurement result. In comparison with the prior art in which events or measurement results are uniformly reported according to cell signal quality or signal strength, non-reporting or deferred reporting or advance reporting of an event or a measurement result of a first-type cell or a cell with the first HCS priority may be controlled according to a requirement, so that an objective of deferring removing the first-type cell or the cell with the first HCS priority from an active set of the UE or adding in advance the UE to an active set is achieved. Thereby, a handover signaling overhead for handing over to the first-type cell or the cell with the first HCS priority may be reduced, handing over to the first-type cell or the cell with the first HCS priority in time is implemented, and a handover failure is avoided.

Optionally, in another implementation manner of the embodiment of the present application, a specific implementation method of step 103 may further be as follows:

103e. If a first-type cell and a second-type cell that are indicated by the measurement configuration information simultaneously exist in the active set, a measurement result of the second-type cell does not affect event evaluation of the first-type cell.

An implementation manner of steps 103a and 103b is using a measurement result of a second-type cell to affect event evaluation of a first-type cell, and when an event 1b trigger threshold is met, determining, according to the measurement configuration information, whether to report an event 1b. In steps 103e and 103f, in evaluation of whether a first-type cell meets an event 1b, a measurement result of a second-type cell is not considered, so that the first-type cell does not meet the event 1b trigger threshold due to high signal quality or signal strength of the second-type cell.

103f. If only a first-type cell indicated by the measurement configuration information exists in the active set, when cell signal quality or signal strength of the first-type cell meets an event 1b trigger threshold, use a measurement result of a second-type cell to affect event evaluation of the first-type cell, so that the cell is removed from the active set according to an active set update message sent by the control node.

Similarly, step 103 may further include the following implementation manners:

If a cell with the first HCS priority and a cell with the second HCS priority that are indicated by the measurement configuration information simultaneously exist in the active set, skipping using a measurement result of the cell with the second HCS priority to affect event evaluation of the cell with the first HCS priority; in another embodiment of the present invention, if only a cell with the first HCS priority indicated by the measurement configuration information exists in the active set, when cell signal quality or signal strength of the cell with the first HCS priority meets an event 1b trigger threshold, a measurement result of a cell with the second HCS priority is used to affect event evaluation of the cell with the first HCS priority.

In another embodiment of the present invention, if a first-type cell and a second-type cell that are indicated by the measurement configuration information simultaneously exist in the active set, and an optimal cell or a serving cell is the second-type cell, a measurement result of the second-type cell does not affect event evaluation of the first-type cell; in another embodiment of the present invention, if an optimal cell or a serving cell is a first-type cell indicated by the measurement configuration information, when cell signal quality or signal strength of a first-type cell other than the optimal cell or serving cell meets an event 1b trigger threshold, a measurement result of a second-type cell is used to affect event evaluation of the first-type cell.

In another embodiment of the present invention, if a cell with the first HCS priority and a cell with the second HCS priority that are indicated by the measurement configuration information simultaneously exist in the active set, and an optimal cell or a serving cell is the cell with the second HCS priority, skipping using a measurement result of the cell with the second HCS priority to affect event evaluation of the cell with the first HCS priority; in another embodiment of the present invention, if an optimal cell or a serving cell is a cell with the first HCS priority indicated by the measurement configuration information, when cell signal quality or signal strength of another cell with the first HCS priority than the optimal cell or serving cell meets an event 1b trigger threshold, a measurement result of a cell with the second HCS priority is used to affect event evaluation of the cell with the first HCS priority.

By using the measurement control method provided in the foregoing implementation manners of the embodiment of the present application, a user equipment (UE) may selectively use, according to first-type cells and second-type cells or cells with the first HCS priority and cells of the second HCS priority that are indicated by measurement configuration information, measurement results of some cells to affect event evaluation of the first-type cells, so that the first-type cells or the cells with the first HCS priority do not easily meet an event 1b trigger threshold, and that an objective of deferring removing the first-type cells or the cells with the first HCS priority from an active set of the UE is achieved. Thereby, handover signaling overheads for handing over to the first-type cells or the cells with the first HCS priority may be reduced, handing over to the first-type cells or the cells with the first HCS priority in time is implemented, and handover failures are avoided.

Optionally, in another implementation manner of the embodiment of the present application, a specific implementation method of step 103 may further be as follows:

103g. According to the dedicated parameter for evaluating the event trigger threshold in the measurement configuration information, evaluate whether an event is met, and if the event is met, trigger reporting of the event to the control node, so that the control node sends an active set update message to the UE according to the received event.

For example, when signal quality or signal strength of a cell is higher than an event 1b trigger threshold that is obtained by using the dedicated parameter, an event 1b trigger threshold is met. When signal quality or signal strength of a cell is lower than an event 1a trigger threshold that is obtained by using the dedicated parameter, an event 1a is met.

The measurement configuration information includes the dedicated parameter for evaluating the event trigger threshold. The dedicated parameter for evaluating the event trigger threshold includes: a relative dedicated offset for evaluating the event trigger threshold or an absolute dedicated parameter for evaluating the event trigger threshold. The network side may send one or a group of relative dedicated offsets for evaluating the event trigger threshold. The UE may obtain a new parameter by calculation by adding the offset to the original parameter for evaluating the event trigger threshold, evaluate the event trigger threshold by using the new parameter, and trigger reporting. In another embodiment of the present invention, the network side may also send an absolute dedicated parameter, so that the UE may determine an event by using the newly configured absolute dedicated parameter.

Specifically, the dedicated parameter for evaluating the event trigger threshold may include one or more of the following parameters: a cell individual offset (CIO), a hysteresis, a weight, a reporting range, and duration meeting an event trigger condition. In the measurement configuration information, dedicated parameters may be sent for one or more cells, for a type of cell, or for a list of cells. In an actual application, one of the parameters may be changed, or multiple parameters may be changed.

For example, when the UE is in a small cell, a dedicated evaluation parameter may be configured for a macro cell, so that an event trigger threshold of the macro cell, which is obtained by the UE by calculation according to the dedicated evaluation parameter, is lower. For example, a larger CIO, a smaller hysteresis, a larger weight (W), a larger reporting range (R), and the like may be configured for the macro cell, so that the macro cell triggers an event 1a earlier and joins the active set in advance, and on the other hand, triggers an event 1b later, and defers exiting the active set. For another example, when the UE is in a macro cell, a dedicated evaluation parameter may be configured for a small cell, so that a dedicated event trigger threshold of the small cell is higher. For example, a smaller CIO, a larger hysteresis, a smaller weight (W), a larger reporting range (R), and the like may be configured for the small cell, so that the small cell triggers an event 1a later and defers joining the active set.

By using the measurement control method provided in the foregoing application scenario of the embodiment of the present application, an event trigger threshold of a specific cell may be evaluated according to a dedicated parameter indicated by measurement configuration information. In comparison with the prior art in which all cells use a same event trigger threshold, an event trigger threshold may be adjusted according to a requirement, and an objective of deferring removing a first-type cell from an active set of a user equipment (UE) or adding in advance a corresponding cell to an active set of the UE is achieved. Thereby, a handover signaling overhead for handing over to the first-type cell may be reduced, handing over to the first-type cell in time is implemented, and a handover failure is avoided.

Optionally, in another application scenario of the embodiment of the present application, a specific implementation method of step 103 may further be as follows:

103h. If the cell is a first-type cell or a cell with the first HCS priority indicated by the measurement configuration information, preferentially report the measurement result of the cell to the control node.

The measurement configuration information includes a list of first-type cells, the type of first-type cells, HCS priorities, or a frequency of first-type cells. The cells include all cells detected by the UE. The UE may detect signal quality or signal strength of one or more cells. However, in this embodiment, because the number of measurement results reported by the UE on a random access channel (RACH) is limited, measurement results of the first-type cells or cells with the first HCS priority are preferentially reported according to a rule indicated by the measurement configuration information. For example, the maximum number of intra-frequency cell measurement results reported on the RACH is a current cell plus six optimal neighboring cells. For inter-frequency cell measurements, measurement results of only eight cells can be reported at most. Therefore, by using the measurement configuration information, priorities for reporting measurement results may be specified. Thereby, measurement results of the first-type cells are reported preferentially, and it is convenient for the network to perform macro cell diversity reception and transmission in time. For an intra-frequency scenario, a radio link between the UE and a macro cell may be established as early as possible. For an inter-frequency scenario, redirection may be performed in advance. Thereby, a problem that a radio link failure or a handover failure occurs because the moving UE cannot be handed over in time is avoided.

By using the measurement control method provided in the foregoing application scenario of the embodiment of the present application, discriminative reporting of measurement results such as preferential reporting or deferred reporting may be performed according to first-type cells and second-type cells indicated by measurement configuration information. In comparison with the prior art in which a same policy is used to report measurement results of all cells, a time sequence for reporting a measurement result of each cell may be configured according to a requirement, so that an objective of deferring removing a first-type cell from an active set of a user equipment (UE) or adding in advance a corresponding cell to an active set of the UE is achieved. Thereby, a handover signaling overhead for handing over to the first-type cell may be reduced, handing over to the first-type cell in time is implemented, and a handover failure is avoided.

Figure 2:
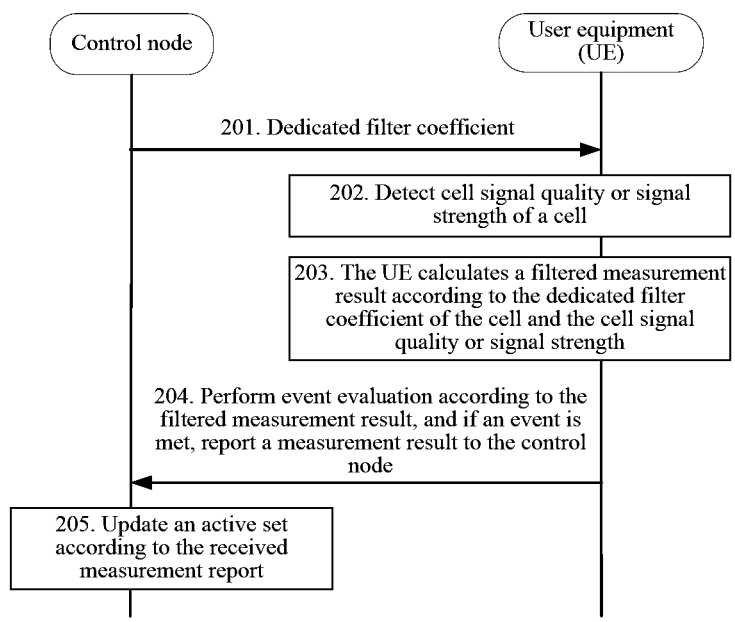
FIG. 2 is a flowchart of a measurement control method according to another embodiment of the present application.

Another embodiment of the present application further provides a measurement control method, where a dedicated filter coefficient may be used to adjust measurement reporting of a user equipment (UE), as shown in FIG. 2.

201. A user equipment (UE) receives a dedicated filter coefficient sent by a control node.

The dedicated filter coefficient includes: an offset relative to a filter coefficient, or a new absolute filter coefficient. When the offset relative to the filter coefficient is received, an absolute filter coefficient is obtained by calculation according to an initial filter coefficient and the offset relative to the filter coefficient. The manner of sending a dedicated filter coefficient is similar to the manner of sending a dedicated parameter that is described in step 103*e*. A new absolute filter coefficient may also be acquired from a network side and used as a dedicated filter coefficient. In this embodiment, a filter coefficient used for an event 1a or 1a and a filter coefficient used for an event 1d may be the same or may be different. For example, for the event 1d, a dedicated filter coefficient may not be used, but an existing filter coefficient may continue to be used. The event 1d means that an optimal cell of the UE changes.

202. The UE detects cell signal quality or signal strength of a cell.

203. The UE calculates a filtered measurement result according to the dedicated filter coefficient of the cell and the cell signal quality or signal strength.

A filter formula for calculating a filtered measurement result according to a latest measurement result and a filter coefficient is: $Fn=(1-a)Fn-1+aMn$, where $a=1/2(k/2)$, k is a filter coefficient, Fn is a filtered measurement result, Fn−1 is a historical measurement result, and Mn is a latest measurement result received by the UE from a physical layer.

For example, when an optimal cell or a serving cell is a first-type cell or a cell with the first HCS priority, the dedicated filter coefficient configured by the network for the UE may have a positive offset relative to the existing filter coefficient. For example, when the UE enters coverage of a small cell from a macro cell, for a smooth handover, a filter coefficient of the small cell may be increased, so that signal quality or signal strength of the small cell increases slowly. In another embodiment of the present invention, a filter coefficient of the macro cell is increased, so that signals of the macro cell deteriorate slowly, and thereby adding the small cell to an active set is deferred.

When an optimal cell or a serving cell is a second-type cell or a cell with a higher priority, the dedicated filter coefficient configured by the network for the UE may have a negative offset relative to the existing filter coefficient. For example, when the UE leaves the coverage of the small cell, because signal quality or signal strength of the small cell deteriorates quickly, for handing over to the macro cell in time, the filter coefficient of the small cell may be reduced, so that signals of the small cell deteriorate slowly and that the macro cell is added to the active set in advance.

204. The UE performs event evaluation according to the filtered measurement result, and if an event is met, reports a measurement result to the control node.

In this embodiment, for an individual cell for which a dedicated filter coefficient is configured, the UE does not directly report detected cell signal quality or signal strength to the control node as a measurement result, but reports a filtered measurement result that is calculated by using the dedicated filter coefficient.

205. The control node updates an active set according to the received measurement report.

For example, when the measurement result indicates that signal quality of cell A in the active set is lower than a predetermined threshold, an active set update message for removing cell A is sent to the UE; when the measurement result indicates that signal quality of cell B beyond the active set is higher than a predetermined threshold, an active set update message for adding cell B to the active set is sent to the UE.

In this embodiment, smooth processing may be performed for a measurement result according to a dedicated filter coefficient, so that cell signal quality or signal strength changes smoothly, and thereby a control node may update an active set according to a filtered measurement result.

By using the measurement control method provided by the embodiment of the present application, smooth filtering may be performed discriminatively for detected measurement results according to a dedicated filter coefficient of each cell. In comparison with the prior art in which a same filter coefficient is used to calculate measurement results of all cells, a change of the measurement result of each cell may be accelerated or slowed down according to a requirement, so that an objective of deferring removing a first-type cell from an active set of a user equipment (UE) or adding in advance a corresponding cell to an active set of the UE is achieved. Thereby, the first-type cell is retained in the active set as far as possible, a handover signaling overhead for handing over to the first-type cell may be reduced, handing over to the first-type cell in time is implemented, and a handover failure is avoided.

Figure 3:
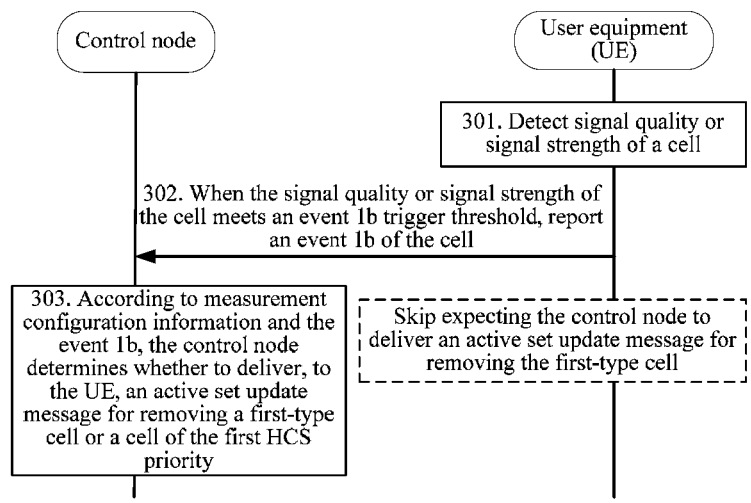
FIG. 3 is a flowchart of a measurement control method according to another embodiment of the present application.

Another embodiment of the present application further provides a measurement control method. As shown in FIG. 3, the method of this embodiment may be as follows:

301. A user equipment (UE) detects signal quality or signal strength of a cell.

302. When the signal quality or signal strength of the cell meets an event 1b trigger threshold, a control node receives an event 1b of the cell reported by the UE.

In this embodiment, measurement configuration information is configured on the control node, but may not be sent to the UE, and the UE normally performs a measurement and reports an event 1b.

303. According to measurement configuration information and the event 1b, the control node determines whether to send, to the UE, an active set update message for removing a first-type cell or a cell with the first HCS priority.

For example, the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

Similar to the measurement configuration information described in steps 103*a*, 103*b*, 103*c*, and 103*d*, the measurement configuration information in this embodiment may indicate first-type cells and second-type cells; in another embodiment of the present invention, the measurement configuration information may indicate cells with the first HCS priority and cells of the second HCS priority. After receiving an event 1b reported by the UE, the control node determines, according to the first-type cells and second-type cells indicated by the measurement configuration information, to send an active set update message; in another embodiment of the present invention, the control node determines, according to the cells with the first HCS priority and the cells of the second HCS priority indicated by the measurement configuration information, to send an active set update message.

Further, optionally, after receiving an event 1b, the control node may not necessarily send an active set update message to the UE. Therefore, the control node may also send the measurement configuration information to the UE in advance, so that after the UE reports an event 1b, the UE may not expect the control node to send an active set update message for removing a first-type cell or a cell with the first HCS priority, that is, even if no active set update message is received in a time period, reporting of an event 1b is not changed to periodic reporting of an event 1b. Then after the UE reports an event 1b of a first-type cell or a cell with the first HCS priority, if still no active set update message is received in a time period, sending of an event 1b of the first-type cell or the cell with the first HCS priority is not changed to periodic sending.

Further, optionally, in an implementation manner of this embodiment, a specific implementation method of step 303 may be as follows:

303*a*. If a first-type cell and a second-type cell that are indicated by the measurement configuration information simultaneously exist in an active set of the UE, do not send an active set update message for removing the first-type cell. In another embodiment of the present invention, if a cell with the first HCS priority and a cell with the second HCS priority that are indicated by the measurement configuration information simultaneously exist in an active set of the UE, an active set update message for removing the cell with the first HCS priority is not sent.

303*b*. If only a first-type cell indicated by the measurement configuration information exists in an active set of the UE, after an event 1b of the first-type cell reported by the UE is received, send, to the UE, an active set update message for removing the first-type cell.

In another embodiment of the present invention, if only a cell with the first HCS priority indicated by the measurement configuration information exists in an active set of the UE, after an event 1b that is of the cell with the first HCS priority and reported by the UE is received, an active set update message for removing the cell with the first HCS priority is sent to the UE.

A determining method in steps 303*a* and 303*b* is similar to that in steps 103*a* and 103*b*. A difference lies in that in this embodiment, the UE performs reporting normally and that an entity for determining whether to update the active set is the control node.

Optionally, in another implementation manner of the embodiment of the present application, a specific implementation method of step 303 may further be as follows:

303*c*. If a first-type cell and a second-type cell that are indicated by the measurement configuration information simultaneously exist in an active set of the UE, and an optimal cell or a serving cell is the second-type cell, do not send, to the UE, an active set update message for removing the first-type cell.

In another embodiment of the present invention, if a cell with the first HCS priority and a cell with the second HCS priority that are indicated by the measurement configuration information simultaneously exist in an active set of the UE, and an optimal cell or a serving cell is the cell of the second HCS priority, an active set update message for removing the cell with the first HCS priority is not sent to the UE.

303*d*. If an optimal cell or a serving cell of the UE is a first-type cell indicated by the measurement configuration information, and an event 1b that is of a first-type cell other than the optimal cell or serving cell and reported by the UE is received, send an active set update message for removing the first-type cell.

In another embodiment of the present invention, if an optimal cell or a serving cell of the UE is a cell with the first HCS priority indicated by the measurement configuration information, when an event 1b that is of a cell with the first HCS priority other than the optimal cell or serving cell and reported by the UE is received, an active set update message for removing the cell with the first HCS priority is sent.

A determining method in steps 303*c* and 303*d* is similar to that in steps 103*c* and 103*d*. A difference lies in that in this embodiment, the UE performs reporting normally and that an entity for determining whether to update the active set is the control node.

By using the measurement control method provided by the embodiment of the present application, a control node may discriminatively send an active set update message according to first-type cells and second-type cells indicated by measurement configuration information or according to cells with the first HCS priority and cells with a higher priority indicated by measurement configuration. In comparison with the prior art in which after an event 1b of each cell is received, an active set update message is uniformly sent and the cell is removed, the control node may select, according to a requirement, temporarily not to send an active set update message for removing a first-type cell or a cell with the first HCS priority, and thereby achieve an objective of deferring removing the first-type cell or the cell with the first HCS priority from an active set of a user equipment (UE). Thereby, the first-type cell or the cell with the first HCS priority is retained in the active set as far as possible, a handover signaling overhead for handing over to the first-type cell or the cell with the first HCS priority may be reduced, handing over to the first-type cell or the cell with the first HCS priority in time is implemented, and a handover failure is avoided.

Figure 4:
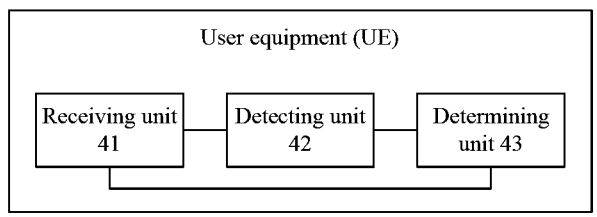
FIG. 4 is a schematic diagram of composition of a user equipment (UE) according to another embodiment of the present application.

Another embodiment of the present application further provides a user equipment (UE). As shown in FIG. 4, the UE may include a receiving unit 41, a detecting unit 42, and a determining unit 43.

The receiving unit 41 is configured to receive measurement configuration information sent by a control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

The detecting unit 42 is configured to detect cell signal quality or signal strength of a cell.

The determining unit 43 is configured to determine, according to the cell signal quality or signal strength detected by the detecting unit 42 and the measurement configuration information received by the receiving unit, whether to report an event or a measurement result to the control node.

Further, optionally, in an implementation manner of this embodiment, the determining unit 43 includes a first determining module 431 and a second determining module 432.

The first determining module 431 is configured to: when a first-type cell and a second-type cell that are indicated by the measurement configuration information received by the receiving unit 41 simultaneously exist in an active set, skip reporting an event 1b of the first-type cell, or in another embodiment of the present invention, skip using a measurement result of the second-type cell to affect event evaluation of the first-type cell.

The second determining module 432 is configured to: when only a first-type cell indicated by the measurement configuration information received by the receiving unit 41 exists in the active set, and cell signal quality or signal strength of the first-type cell meets an event 1b trigger threshold, report an event 1b of the first-type cell, or in another embodiment of the present invention, use a measurement result of a second-type cell to affect event evaluation of the first-type cell, so that the cell is removed from the active set according to an active set update message sent by the control node.

Optionally, in another implementation manner of this embodiment, the determining unit 43 includes a third determining module 433 and a fourth determining module 434.

The third determining module 433 is configured to: when a first-type cell and a second-type cell that are indicated by the measurement configuration information received by the receiving unit 41 simultaneously exist in an active set, and an optimal cell or a serving cell is the second-type cell, skip reporting an event 1b of the first-type cell, or in another embodiment of the present invention, a measurement result of the second-type cell does not affect event evaluation of the first-type cell; in another embodiment of the present invention, when a cell with the first HCS priority and a cell with the second HCS priority that are indicated by the measurement configuration information simultaneously exist in an active set, and an optimal cell or a serving cell is the cell with the second HCS priority, skip reporting an event 1b of the cell with the first HCS priority, or in another embodiment of the present invention, skipping using a measurement result of the cell with the second HCS priority to affect event evaluation of the cell with the first HCS priority.

The fourth determining module 434 is configured to: when an optimal cell or a serving cell is a first-type cell or a cell with the first HCS priority indicated by the measurement configuration information received by the receiving unit 41, and cell signal quality or signal strength of a first-type cell or a cell with the first HCS priority other than the optimal cell or serving cell meets an event 1b trigger threshold, report an event 1b of the first-type cell or the cell with the first HCS priority other than the optimal cell or serving cell.

Optionally, in another implementation manner of this embodiment, the determining unit 43 includes a fifth determining module 435.

The fifth determining module 435 is configured to trigger reporting of the event to the control node according to the event trigger threshold and the cell signal quality or signal strength of the cell, so that the control node sends an active set update message to the UE according to the received event; where the measurement configuration information received by the receiving unit 41 includes the dedicated parameter for evaluating the event trigger threshold.

Optionally, in another implementation manner of this embodiment, the determining unit 43 includes a sixth determining module 436.

The sixth determining module 436 is configured to preferentially report the measurement result of the cell to the control node when the cell is a first-type cell indicated by the measurement configuration information received by the receiving unit 41.

Figure 5:
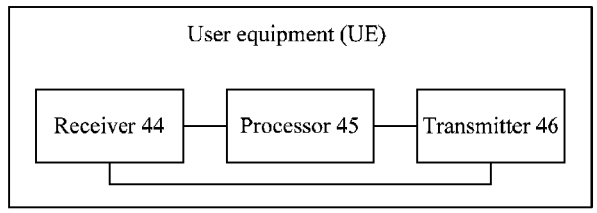
FIG. 5 is a schematic diagram of composition of another UE according to another embodiment of the present application.

An embodiment of the present application further provides a user equipment (UE). As shown in FIG. 5, the UE may include a receiver 44, a processor 45, and a transmitter 46.

The receiver 44 is configured to receive measurement configuration information sent by a control node, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

The processor 45 is configured to detect cell signal quality or signal strength of a cell.

The transmitter 46 is configured to determine, according to the cell signal quality or signal strength detected by the processor 45 and the measurement configuration information received by the receiver 44, whether to report an event or a measurement result to the control node.

Further, optionally, the transmitter 46 is further configured to: when a first-type cell and a second-type cell that are indicated by the measurement configuration information received by the receiver 44 simultaneously exist in an active set, skip reporting an event 1b of the first-type cell, or in another embodiment of the present invention, a measurement result of the second-type cell does not affect event evaluation of the first-type cell; or when only a first-type cell indicated by the measurement configuration information received by the receiver 44 exists in the active set, and cell signal quality or signal strength of the first-type cell meets an event 1b trigger threshold, report an event 1b of the first-type cell, or in another embodiment of the present invention, use a measurement result of a second-type cell to affect event evaluation of the first-type cell, so that the cell is removed from the active set according to an active set update message sent by the control node.

Optionally, the transmitter 46 is further configured to: when a first-type cell and a second-type cell that are indicated by the measurement configuration information received by the receiver 44 simultaneously exist in the active set, and an optimal cell or a serving cell is the second-type cell, skip reporting an event 1b of the first-type cell, or in another embodiment of the present invention, a measurement result of the second-type cell does not affect event evaluation of the first-type cell; in another embodiment of the present invention, when a cell with the first HCS priority and a cell with the second HCS priority that are indicated by the measurement configuration information simultaneously exist in the active set, and an optimal cell or a serving cell is the cell with the second HCS priority, skip reporting an event 1b of the cell with the first HCS priority, or in another embodiment of the present invention, skipping using a measurement result of the cell with the second HCS priority to affect event evaluation of the cell with the first HCS priority; or in another embodiment of the present invention, when an optimal cell or a serving cell is a first-type cell or a cell with the first HCS priority indicated by the measurement configuration information received by the receiver, and cell signal quality or signal strength of a first-type cell or a cell with the first HCS priority other than the optimal cell or serving cell meets an event 1b trigger threshold, report an event 1b of the first-type cell or the cell with the first HCS priority other than the optimal cell or serving cell, or in another embodiment of the present invention, use a measurement result of a second-type cell to affect event evaluation of the first-type cell.

Optionally, the transmitter 46 is further configured to: trigger reporting of the event to the control node according to the event trigger threshold and the cell signal quality or signal strength of the cell, so that the control node sends an active set update message to the UE according to the received event; where the measurement configuration information received by the receiver 44 includes the dedicated parameter for evaluating the event trigger threshold.

Optionally, the transmitter 46 is further configured to: preferentially report the measurement result of the cell to the control node when the cell is a first-type cell indicated by the measurement configuration information received by the receiver 44.

By using the UE provided by the embodiment of the present application, whether to report an event or a measurement result is determined according to measurement configuration information and detected cell signal quality or signal strength. In comparison with the prior art in which events or measurement results are uniformly reported according to cell signal quality or signal strength, non-reporting or deferred reporting or advance reporting of an event or a measurement result of a first-type cell may be controlled according to a requirement, so that the first-type cell is retained in an active set of the UE as far as possible. Thereby, a handover signaling overhead for handing over to the first-type cell may be reduced, handing over to the first-type cell in time is implemented, and a handover failure is avoided.

Figure 6:
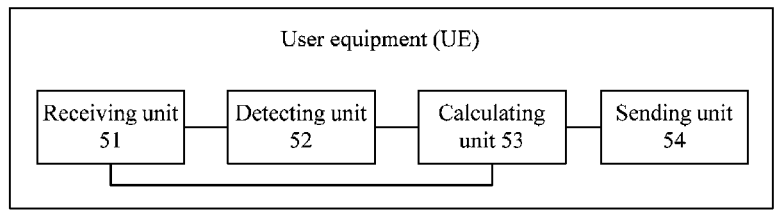
FIG. 6 is a schematic diagram of composition of a user equipment (UE) according to another embodiment of the present application.

Another embodiment of the present application further provides a user equipment (UE). As shown in FIG. 6, the UE may include a receiving unit 51, a detecting unit 52, a calculating unit 53, and a sending unit 54.

The receiving unit 51 is configured to receive a dedicated filter coefficient sent by a control node.

The detecting unit 52 is configured to detect cell signal quality or signal strength of a cell.

The calculating unit 53 is configured to calculate a filtered measurement result according to the dedicated filter coefficient of the cell received by the receiving unit 51 and the cell signal quality or signal strength detected by the detecting unit.

The sending unit 54 is configured to report the filtered measurement result obtained by the calculating unit 53 by calculation to the control node.

Figure 7:
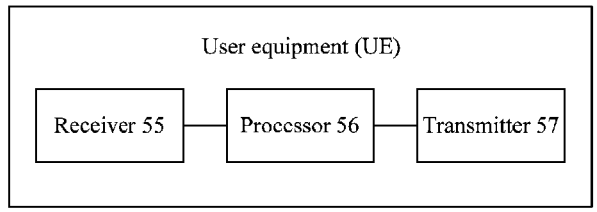
FIG. 7 is a schematic diagram of composition of another UE according to another embodiment of the present application.
Figure 8:
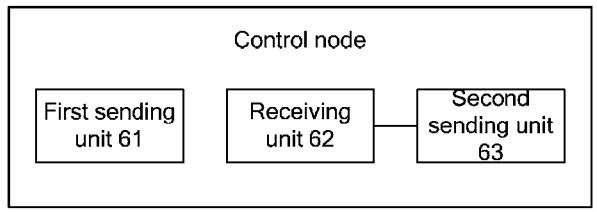
FIG. 8 is a schematic diagram of composition of a control node according to another embodiment of the present application.

An embodiment of the present application further provides a user equipment (UE). As shown in FIG. 7, the UE includes a receiver 55, a processor 56, and a transmitter 57.

The receiver 55 is configured to receive a dedicated filter coefficient sent by a control node.

The processor 56 is configured to detect cell signal quality or signal strength of a cell, and calculate a filtered measurement result according to the dedicated filter coefficient of the cell received by the receiver 55 and the detected cell signal quality or signal strength.

The transmitter 57 is configured to report the filtered measurement result obtained by the processor 56 by calculation to the control node.

It should be noted that, implementation of functions such as caching and storing some data or information necessarily requires a memory; because use of the memory is a common technical means for a person skilled in the art, the memory is not further described in detail in any embodiment of the present application.

By using the UE provided by the embodiment of the present application, whether to report an event or a measurement result is determined according to a dedicated filter coefficient and detected cell signal quality or signal strength. In comparison with the prior art in which events or measurement results are uniformly reported according to cell signal quality or signal strength, non-reporting or deferred reporting or advance reporting of an event or a measurement result of a first-type cell may be controlled according to a requirement, so that the first-type cell or a cell with the first HCS priority is retained in an active set of the UE as far as possible. Thereby, a handover signaling overhead for handing over to the first-type cell or the cell with the first HCS priority may be reduced, handing over to the first-type cell or the cell with the first HCS priority in time is implemented, and a handover failure is avoided.

Another embodiment of the present application further provides a control node, which may include a first sending unit 61, a receiving unit 62, and a second sending unit 63.

The first sending unit 61 is configured to send measurement configuration information to a user equipment (UE), where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

The receiving unit 62 is configured to: when the UE determines, according to cell signal quality or signal strength and the measurement configuration information, to report an event or a measurement result, receive the event or the measurement result reported by the UE.

The second sending unit 63 is configured to send an active set update message to the UE according to the event or the measurement result received by the receiving unit 62.

This embodiment further provides another control node, including a transmitter 64 and a receiver 65.

The transmitter 64 is configured to send measurement configuration information to a user equipment (UE), where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

The receiver 65 is configured to: when the UE determines, according to cell signal quality or signal strength and the measurement configuration information, to report an event or a measurement result, receive the event or the measurement result reported by the UE.

The transmitter 64 is further configured to send an active set update message to the UE according to the event or the measurement result received by the receiver 65.

The control node provided by the embodiment of the present application sends measurement configuration information to a user equipment (UE), so that the UE is controlled to determine, according to the measurement configuration information and detected cell signal quality or signal strength, whether to report an event or a measurement result. In comparison with the prior art in which events or measurement results are uniformly reported according to cell signal quality or signal strength, the UE may be controlled, according to a requirement, not to report or to defer reporting or to report in advance an event or a measurement result of a first-type cell, so that the first-type cell is retained in an active set of the UE as far as possible. Thereby, a handover signaling overhead for handing over to the first-type cell may be reduced, handing over to the first-type cell in time is implemented, and a handover failure is avoided.

Figure 9:
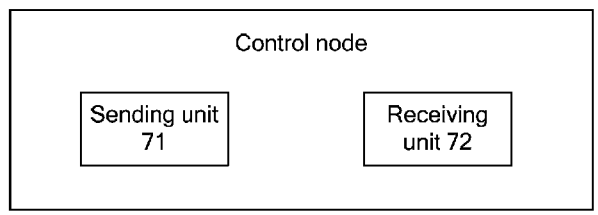
FIG. 9 is a schematic diagram of composition of a control node according to another embodiment of the present application.

Another embodiment of the present application further provides a control node. As shown in FIG. 9, the control node may include a sending unit 71 and a receiving unit 72.

The sending unit 71 is configured to send a dedicated filter coefficient to a user equipment (UE).

The receiving unit 72 is configured to receive a filtered measurement result reported by the UE, where the filtered measurement result is obtained by calculation according to the dedicated filter coefficient and cell signal quality or signal strength.

Further, the sending unit 71 may include a first sending unit 711 and a second sending unit 712.

The first sending unit 711 is configured to: when an optimal cell or a serving cell of the UE is a first-type cell or a cell with the first HCS priority, send, to the UE, a dedicated filter coefficient that has a positive offset relative to an existing filter coefficient.

The second sending unit 712 is configured to: when an optimal cell or a serving cell of the UE is a second-type cell or a cell with the second HCS priority, send, to the UE, a dedicated filter coefficient that has a negative offset relative to an existing filter coefficient.

This embodiment further provides a control node, including a transmitter 73 and a receiver 74.

The transmitter 73 is configured to send a dedicated filter coefficient to a user equipment (UE).

The receiver 74 is configured to receive a filtered measurement result reported by the UE, where the filtered measurement result is obtained by calculation according to the dedicated filter coefficient and cell signal quality or signal strength.

Further, optionally, the transmitter 73 is further configured to: when an optimal cell or a serving cell of the UE is a first-type cell or a cell with the first HCS priority, send, to the UE, a dedicated filter coefficient that has a positive offset relative to an existing filter coefficient; or when an optimal cell or a serving cell of the UE is a second-type cell or a cell with the second HCS priority, send, to the UE, a dedicated filter coefficient that has a negative offset relative to an existing filter coefficient.

The control node provided by the embodiment of the present application sends a dedicated filter coefficient to a user equipment (UE) for one or more cells, so that the UE is controlled to determine, according to the dedicated filter coefficient and detected cell signal quality or signal strength, whether to report an event or a measurement result. In comparison with the prior art in which events or measurement results are uniformly reported according to cell signal quality or signal strength, the UE may be controlled, according to a requirement, not to report or to defer reporting or to report in advance an event or a measurement result of a first-type cell, so that the first-type cell is retained in an active set of the UE as far as possible. Thereby, a handover signaling overhead for handing over to the first-type cell may be reduced, handing over to the first-type cell in time is implemented, and a handover failure is avoided.

Figure 10:
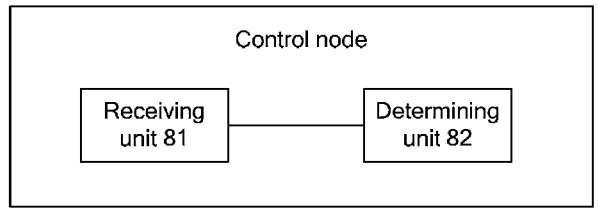
FIG. 10 is a schematic diagram of composition of a control node according to another embodiment of the present application.

Another embodiment of the present application further provides a control node. As shown in FIG. 10, the control node may include: a receiving unit 81, configured to receive an event 1b of a cell reported by a user equipment (UE); and a determining unit 82, configured to determine, according to measurement configuration information and the event 1b received by the receiving unit 81, whether to send an active set update message to the UE, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

In an implementation manner of this embodiment, the determining unit 82 includes a seventh determining unit 821 and an eighth determining unit 822.

The seventh determining unit 821 is configured to: when a first-type cell and a second-type cell that are indicated by the measurement configuration information simultaneously exist in an active set of the UE, skip sending an active set update message for removing the first-type cell.

The eighth determining unit 822 is configured to: when only a first-type cell indicated by the measurement configuration information exists in the active set of the UE, and after an event 1b of the first-type cell reported by the UE is received, send, to the UE, an active set update message for removing the first-type cell.

In another implementation manner of this embodiment, the determining unit 82 includes a ninth determining unit 823 and a tenth determining unit 824.

The ninth determining unit 823 is configured to: when a first-type cell and a second-type cell that are indicated by the measurement configuration information simultaneously exist in an active set of the UE, and an optimal cell or a serving cell is the second-type cell, skip sending, to the UE, an active set update message for removing the first-type cell; or in another embodiment of the present invention, when a cell with the first HCS priority and a cell with the second HCS priority that are indicated by the measurement configuration information simultaneously exist in an active set, and an optimal cell or a serving cell is the cell with the second HCS priority, skip reporting an event 1b of the cell with the first HCS priority.

The tenth determining unit 824 is configured to: when an optimal cell or a serving cell of the UE is a first-type cell or a cell with the first HCS priority indicated by the measurement configuration information, and an event 1b that is of a first-type cell or a cell with the first HCS priority other than the optimal cell or serving cell and reported by the UE is received, send an active set update message for removing the first-type cell or the cell with the first HCS priority than the optimal cell or serving cell.

This embodiment further provides a control node, including: a receiver 83, configured to receive an event 1b of a cell reported by a user equipment (UE); and a transmitter 84, configured to determine, according to measurement configuration information and the event 1b received by the receiver 83, whether to send an active set update message to the UE, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

Further, optionally, the transmitter 84 is further configured to: when a first-type cell and a second-type cell that are indicated by the measurement configuration information simultaneously exist in an active set of the UE, skip sending an active set update message for removing the first-type cell; or when only a first-type cell indicated by the measurement configuration information exists in an active set of the UE, after an event 1b of the first-type cell reported by the UE is received, send, to the UE, an active set update message for removing the first-type cell.

Optionally, the transmitter 84 is further configured to: when a first-type cell and a second-type cell that are indicated by the measurement configuration information simultaneously exist in an active set of the UE, and an optimal cell or a serving cell is the second-type cell, skip sending, to the UE, an active set update message for removing the first-type cell; or in another embodiment of the present invention, when a cell with the first HCS priority and a cell with the second HCS priority that are indicated by the measurement configuration information simultaneously exist in an active set, and an optimal cell or a serving cell is the cell with the second HCS priority, skip sending, to the UE, an active set update message for removing the first-type cell; or when an optimal cell or a serving cell of the UE is a first-type cell or a cell with the first HCS priority indicated by the measurement configuration information, and an event 1b that is of a first-type cell or a cell with the first HCS priority other than the optimal cell or serving cell and reported by the UE is received, send an active set update message for removing the first-type cell or the cell with the first HCS priority than the optimal cell or serving cell.

By using the control node provided by the embodiment of the present application, whether to report an event or a measurement result is determined according to measurement configuration information and detected cell signal quality or signal strength. In comparison with the prior art in which events or measurement results are uniformly reported according to cell signal quality or signal strength, non-reporting or deferred reporting or advance reporting of an event or a measurement result of a first-type cell may be controlled according to a requirement, so that the first-type cell is retained in an active set of a user equipment (UE) as far as possible. Thereby, a handover signaling overhead for handing over to the first-type cell may be reduced, handing over to the first-type cell in time is implemented, and a handover failure is avoided.

Figure 11:
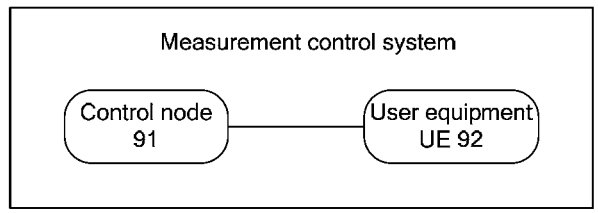
FIG. 11 is a schematic diagram of composition of a measurement control system according to another embodiment of the present application.

Another embodiment of the present application further provides a measurement control system. As shown in FIG. 11, the system may include a control node 91 and a user equipment (UE) 92.

Optionally, the control node 91 is configured to: send measurement configuration information to the UE 92, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold; if the UE 92 determines, according to cell signal quality or signal strength and the measurement configuration information, to report an event or a measurement result, receive the event or the measurement result reported by the UE 92; and send an active set update message to the UE 92 according to the event or measurement result.

Correspondingly, the UE 92 is configured to: receive the measurement configuration information sent by the control node 91, where the measurement configuration information includes the list of the first-type cells, the type of the first-type cells, the list of the second-type cells, the type of the second-type cells, the hierarchical cell structure (HCS) priorities, the frequency of the first-type cells, or the dedicated parameter for evaluating the event trigger threshold; detect the cell signal quality or signal strength of a cell; and determine, according to the cell signal quality or signal strength and the measurement configuration information, whether to report the event or measurement result to the control node 91.

Optionally, the control node 91 is configured to: send a dedicated filter coefficient to the UE 92; and receive a filtered measurement result reported by the UE 92, where the filtered measurement result is obtained by calculation according to the dedicated filter coefficient and cell signal quality or signal strength.

Correspondingly, the UE 92 is configured to: receive the dedicated filter coefficient sent by the control node 91; detect the cell signal quality or signal strength of a cell; calculate the filtered measurement result according to the dedicated filter coefficient of the cell and the cell signal quality or signal strength; and report the filtered measurement result to the control node 91.

Optionally, the control node 91 is configured to: receive an event 1b of a cell reported by the UE 92; and determine, according to measurement configuration information and the event 1b, whether to send an active set update message to the UE 92, where the measurement configuration information includes a list of first-type cells, the type of first-type cells, a list of second-type cells, the type of second-type cells, hierarchical cell structure (HCS) priorities, a frequency of first-type cells, or a dedicated parameter for evaluating an event trigger threshold.

Correspondingly, the UE 92 is configured to: report the event 1b of the cell to the control node 91 according to detected cell signal quality or signal strength; and for the first-type cells indicated by the measurement configuration information, have no expectation that the control node 91 sends an active set update message.

Another embodiment of the present application further provides a link management method, including:

1001. A control node sends a link management indication to a base station, so that the base station no longer sends a radio link failure indication to the control node or sends a radio link failure indication to the control node for only a limited number of times.

The control node may instruct the base station to perform special processing for radio link management of some cells, for example, instruct the base station not to send a radio link failure indication even if first-type cells are out of synchronization, or to send a radio link failure indication for only a limited number of times in another embodiment of the present invention, for example, one time or two times. In another embodiment of the present invention, the control node may instruct the base station not to change sending of a radio link failure indication to periodic event reporting even if the base station does not receive in a time period after sending the radio link failure indication, a link removal message sent by the control node, so that the radio link failure indication does not need to be sent to the control node repeatedly. The some cells may be first-type cells, cells with the first HCSHCS priority, or other specific cells.

Another embodiment of the present application further provides a control node, including a transmitter 1002, configured to send a link management indication to a base station, so that the base station no longer sends a radio link failure indication to the control node or sends a radio link failure indication to the control node for only a limited number of times.

Another embodiment of the present application further provides a link management method, including the following contents.

1101. A base station receives a link management indication sent by a control node, where the link management indication is used to instruct the base station to no longer send a radio link failure indication to the control node or to send a radio link failure indication to the control node for only a limited number of times.

Another embodiment of the present application further provides a base station, including a receiver 1102 configured to receive a link management indication sent by a control node, where the link management indication is used to instruct the base station to no longer send a radio link failure indication to the control node or to send a radio link failure indication to the control node for only a limited number of times.

Another embodiment of the present application further provides a link management method, including:

1201. A base station receives a synchronization detection parameter sent by a control node, where the synchronization detection parameter includes at least one piece of the following information: the number of synchronization primitives, the number of out-of-synchronization primitives, and a failure detection timer.

1202. The base station performs uplink synchronization detection according to the synchronization detection parameter.

Another embodiment of the present application further provides a base station, including a receiver 1203 configured to receive a synchronization detection parameter sent by a control node, where the synchronization detection parameter includes at least one piece of the following information: the number of synchronization primitives, the number of out-of-synchronization primitives, and a failure detection timer; and a processor 1204 configured to perform uplink synchronization detection according to the synchronization detection parameter.

Another embodiment of the present application further provides a link management method, including the following contents.

1301. A control node sends a synchronization detection parameter to a base station, where the synchronization detection parameter includes at least one piece of the following information: the number of synchronization primitives, the number of out-of-synchronization primitives, and a failure detection timer, so that the base station performs uplink synchronization detection according to the synchronization detection parameter.

Another embodiment of the present application further provides a control node, including a transmitter 1302 configured to send a synchronization detection parameter to a base station, where the synchronization detection parameter includes at least one piece of the following information: the number of synchronization primitives, the number of out-of-synchronization primitives, and a failure detection timer, so that the base station performs uplink synchronization detection according to the synchronization detection parameter.

It should be noted that, to retain a first-type cell in an active set as far as possible, it is inevitable that signal quality or signal strength of the first-type cell is not good in some cases, and an out-of-synchronization case may occur. To avoid that the first-type cell (e.g. which is base station) sends a radio link failure indication message to the control node after detecting out-of-synchronization, the control node may instruct the first-type cell to perform special processing for an uplink of a specific UE, and not to send a radio link failure indication to the control node even if out-of-synchronization occurs; in another embodiment of the present invention, a looser synchronization detection parameter is configured for the first-type cell.

Configuring a looser synchronization detection parameter for the first-type cell includes: configuring T (a synchronization detection timer), N1 (the number of out-of-synchronization primitives), N2 (the number of synchronization primitives), and the like. For example, after the first-type cell detects N1 out-of-synchronization primitives, the synchronization detection period T is started; if N2 synchronization primitives are received before T expires, T is reset; and if N2 synchronization primitives are not received before T expires, it is determined that a radio link failure occurs.

In the measurement control system provided by the embodiment of the present application, a user equipment (UE) determines, according to measurement configuration information sent by a control node and detected cell signal quality or signal strength, whether to report an event or a measurement result. In comparison with the prior art in which events or measurement results are uniformly reported according to cell signal quality or signal strength, non-reporting or deferred reporting or advance reporting of an event or a measurement result of a first-type cell may be controlled according to a requirement, so that the first-type cell is retained in an active set of the UE as far as possible. Thereby, a handover signaling overhead for handing over to the first-type cell may be reduced, handing over to the first-type cell in time is implemented, and a handover failure is avoided.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from scope of the technical solutions of the embodiments of the present application.

What is claimed is:

1. A measurement control method, comprising:
   receiving, by a user equipment (UE), measurement configuration information sent by a control node, wherein the measurement configuration information comprises one of a list of first-type cells, a type of first-type cells, a list of second-type cells, a type of second-type cells, hierarchical cell structure (HCS) priorities, a frequency of first-type cells, and a dedicated parameter for evaluating an event trigger threshold;
   detecting, by the UE, one of cell signal quality and signal strength of a cell;
   determining, by the UE, according to the measurement configuration information and one of the cell signal quality and signal strength respectively, whether to report an event or a measurement result of the cell to the control node; and
   when a first-type cell and a second-type cell that are indicated by the measurement configuration information simultaneously exist in an active set, skipping reporting a first event of the first-type cell, wherein the first event of the first-type cell is that signal quality or signal strength of the first-type cell is lower than a predetermined criterion.

2. The method according to claim 1, wherein one of an optimal cell and a serving cell is the second-type cell.

3. The method according to claim 1, further comprising:
   triggering reporting of the event to the control node according to the event trigger threshold and one of the cell signal quality and signal strength of the cell, wherein the dedicated parameter for evaluating the event trigger threshold is used to evaluate the event trigger threshold.

4. The method according to claim 3, wherein the dedicated parameter for evaluating the event trigger threshold comprises: one of a relative dedicated offset for evaluating the event trigger threshold and an absolute dedicated parameter for evaluating the event trigger threshold.

5. The method according to claim 3, wherein the dedicated parameter for evaluating the event trigger threshold comprises one or more of the following parameters: a cell individual offset CIO, a hysteresis, a weight, and a reporting range.

6. A measurement control method, comprising:
   receiving, by a control node, a first event of a cell reported by a user equipment (UE); and
   determining, by the control node, according to measurement configuration information and the first event, whether to send an active set update message to the UE, wherein the measurement configuration information comprises one of a list of first-type cells, the type of first-type cells, a list of second-type cells, the type of second-type cells, hierarchical cell structure (HCS) priorities, a frequency of first-type cells, and a dedicated parameter for evaluating an event trigger threshold, wherein the first event of the cell is that one of signal quality and signal strength of the cell is lower than a predetermined criterion; and
   when a first-type cell and a second-type cell that are indicated by the measurement configuration information simultaneously exist in an active set of the UE, skipping sending, by the control node, an active set update message for removing the first-type cell.

7. The method according to claim 6, wherein an optimal cell or a serving cell is the second-type cell.

8. A user equipment (UE), comprising:
   a receiver, configured to receive measurement configuration information sent by a control node, wherein the measurement configuration information comprises one of a list of first-type cells, the type of first-type cells, a list of second-type cells, the type of second-type cells, hierarchical cell structure (HCS) priorities, a frequency of first-type cells, and a dedicated parameter for evaluating an event trigger threshold;
   a processor, configured to detect one of cell signal quality and signal strength of a cell; and
   a transmitter, configured to determine, according to one of the cell signal quality and signal strength and the measurement configuration information whether to report one of an event and a measurement result to the control node,
   wherein the transmitter is further configured to:
   when a first-type cell and a second-type cell that are indicated by the measurement configuration information simultaneously exist in an active set, skip reporting a first event of the first-type cell, wherein the first event of the first-type cell is that one of signal quality and signal strength of the first-type cell is lower than a predetermined criterion.

9. The UE according to claim 8, wherein one of an optimal cell and a serving cell is the second-type cell.

10. The UE according to claim 8, wherein the transmitter is further configured to:
    trigger reporting of the event according to the event trigger threshold and one of the cell signal quality and signal strength of the cell, to the control node sending an active set update message to the UE according to the received event, wherein the dedicated parameter for evaluating the event trigger threshold is used to evaluate the event trigger threshold.

11. A control node, comprising:
    a receiver, configured to receive a first event of a cell reported by a user equipment (UE), wherein the first event of the cell is that one of signal quality and signal strength of the cell is lower than a predetermined criterion; and
    a transmitter, configured to determine, according to measurement configuration information and the event 1b, whether to send an active set update message to the UE, wherein the measurement configuration information comprises one of a list of first-type cells, the type of first-type cells, a list of second-type cells, the type of second-type cells, hierarchical cell structure (HCS)

priorities, a frequency of first-type cells, and a dedicated parameter for evaluating an event trigger threshold;

wherein the transmitter is further configured to:

when a first-type cell and a second-type cell that are indicated by the measurement configuration information simultaneously exist in an active set of the UE, skip sending an active set update message for removing the first-type cell.

12. The control node according to claim 11, wherein an optimal cell or a serving cell is the second-type cell.

* * * * *